(12) United States Patent
Butland et al.

(10) Patent No.: US 9,290,325 B2
(45) Date of Patent: Mar. 22, 2016

(54) HIGH TEMPERATURE CONVEYOR BELT

(71) Applicant: BTU International, Inc., North Billerica, MA (US)

(72) Inventors: Derek J. Butland, Westford, MA (US); Timothy R. Doherty, Woburn, MA (US); James DiMento, Georgetown, MA (US)

(73) Assignee: BTU INTERNATIONAL, INC., North Billerica, MA (US)

( * ) Notice: Subject to any disclaimer, the term of this patent is extended or adjusted under 35 U.S.C. 154(b) by 0 days.

(21) Appl. No.: 14/736,491

(22) Filed: Jun. 11, 2015

(65) Prior Publication Data

US 2015/0274427 A1    Oct. 1, 2015

Related U.S. Application Data

(63) Continuation of application No. 14/038,012, filed on Sep. 26, 2013, now Pat. No. 9,102,471.

(60) Provisional application No. 61/707,230, filed on Sep. 28, 2012.

(51) Int. Cl.

| | |
|---|---|
| *B65G 15/36* | (2006.01) |
| *B65G 15/38* | (2006.01) |
| *B65G 17/08* | (2006.01) |
| *B65G 15/48* | (2006.01) |
| *B65G 15/42* | (2006.01) |
| *B65G 15/52* | (2006.01) |
| *B65G 15/54* | (2006.01) |
| *B65G 15/64* | (2006.01) |
| *B65G 17/06* | (2006.01) |

(Continued)

(52) U.S. Cl.
CPC ............... *B65G 17/08* (2013.01); *B65G 15/30* (2013.01); *B65G 15/42* (2013.01); *B65G 15/48* (2013.01); *B65G 15/52* (2013.01); *B65G 15/54* (2013.01); *B65G 15/64* (2013.01); *B65G 17/002* (2013.01); *B65G 17/063* (2013.01); *B65G 17/067* (2013.01); *F27D 2003/121* (2013.01)

(58) Field of Classification Search
CPC ............................... B65G 15/36; B65G 15/38
USPC ............... 198/844.1, 846, 847, 848, 849, 952
See application file for complete search history.

(56) References Cited

U.S. PATENT DOCUMENTS

| 1,895,072 A | 1/1933 | Fenton et al. |
|---|---|---|
| 2,234,537 A | 3/1941 | Blackburn |

(Continued)

*Primary Examiner* — Douglas Hess
(74) *Attorney, Agent, or Firm* — Preti Flaherty Beliveau & Pachios LLP

(57) ABSTRACT

A high temperature conveyor belt is provided having a non-metallic conveying surface which will not scratch, abrade or otherwise mar the surface of a product being carried on the belt through a furnace and which will not contaminate the product. In one embodiment, the conveyor comprises a high temperature fabric belt attached to a metal belt which may be a conventional woven metal conveyor belt. In another embodiment, the conveyor is composed of a non-metallic high temperature strand which is woven or threaded through a metal belt to provide a non-metallic conveying surface. In a further embodiment, the non-metallic product support elements are coupled to roller chains at each side of the furnace chamber and which are cooperative with a drive mechanism to transport the conveyor through the furnace. The roller chains can be located outside of the furnace chamber to avoid exposure to the high temperature of the furnace chamber.

5 Claims, 31 Drawing Sheets

(51) Int. Cl.
   *B65G 15/30* (2006.01)
   *B65G 17/00* (2006.01)
   *F27D 3/12* (2006.01)

(56) References Cited

U.S. PATENT DOCUMENTS

| | | |
|---|---|---|
| 2,713,480 A | 7/1955 | Ruchstahl |
| 3,123,354 A | 3/1964 | Ungerer |
| 3,335,843 A | 8/1967 | Duvivier et al. |
| 3,596,753 A | 8/1971 | Knapp et al. |
| 3,922,140 A | 11/1975 | Noritake et al. |
| 4,062,459 A | 12/1977 | Robertson |
| 4,325,478 A | 4/1982 | Richard |
| 4,671,834 A | 6/1987 | Price |
| 4,674,622 A | 6/1987 | Utsonomiya et al. |
| 4,698,504 A | 10/1987 | Van Pelt |
| 4,705,161 A | 11/1987 | Gozdiff |
| 4,899,872 A | 2/1990 | Hokao |
| 5,158,171 A | 10/1992 | Graff |
| 5,167,781 A | 12/1992 | Kemerer et al. |
| 6,666,326 B2 | 12/2003 | Hymes et al. |
| 6,994,210 B2 | 2/2006 | Kerwel et al. |
| 7,244,207 B2 | 7/2007 | Shiriike et al. |
| 7,267,219 B2 | 9/2007 | Vogt |
| 7,438,178 B2 | 10/2008 | Chahal et al. |
| 7,464,809 B2 | 12/2008 | Nozaki et al. |
| 7,484,618 B2 | 2/2009 | Foust |
| 7,703,600 B1 | 4/2010 | Price |
| 8,056,586 B2 | 11/2011 | Kufferath-Kassner et al. |
| 8,783,448 B2 * | 7/2014 | Shoji ............... B65G 15/54 198/844.1 |
| 9,102,471 B2 * | 8/2015 | Butland ............ B65G 15/42 |
| 2004/0109986 A1 | 6/2004 | Keese et al. |
| 2012/0269226 A1 | 10/2012 | Parks et al. |
| 2013/0240333 A1 | 9/2013 | Lewis et al. |

* cited by examiner

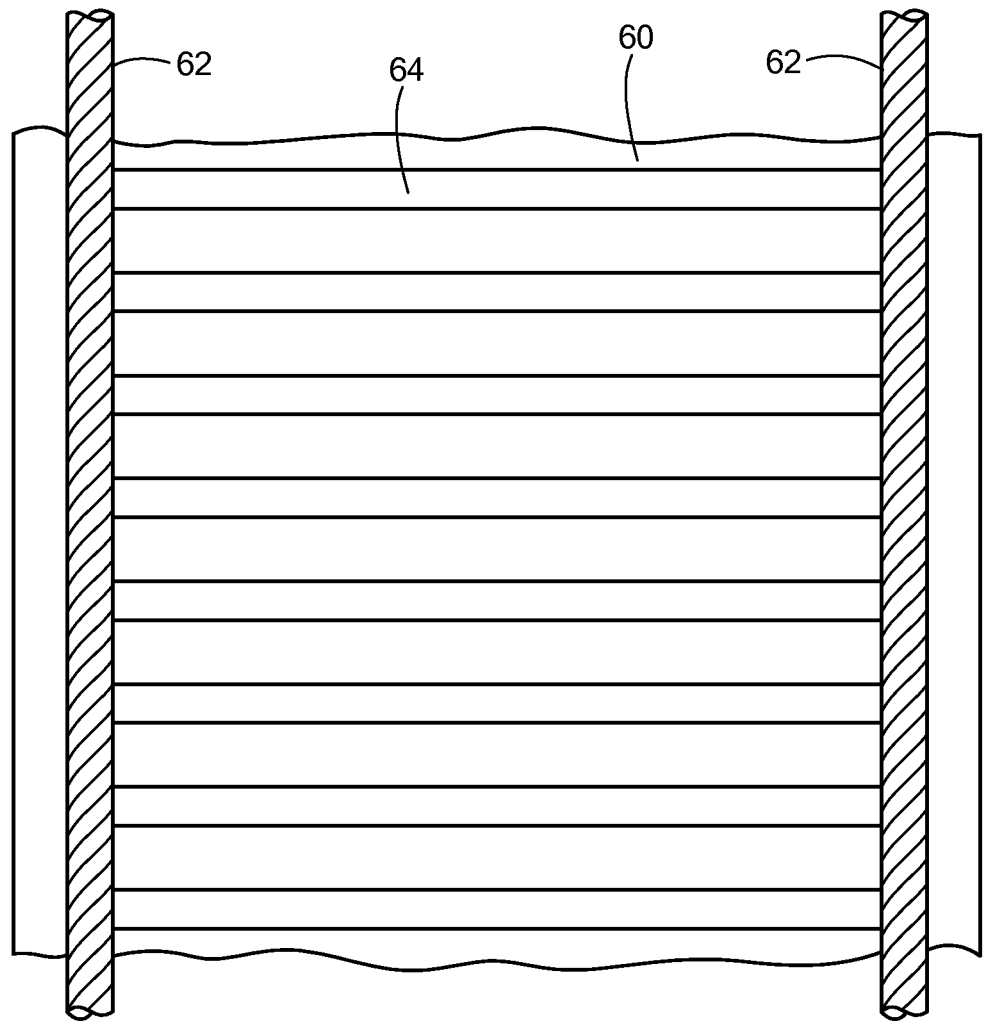
*FIG. 10a*
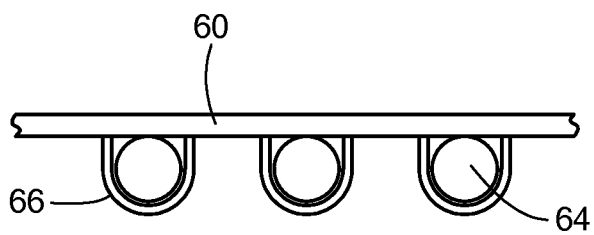 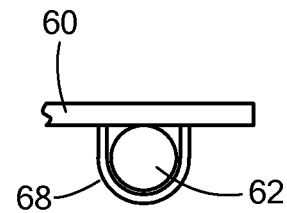
*FIG. 10b*  *FIG. 10c*

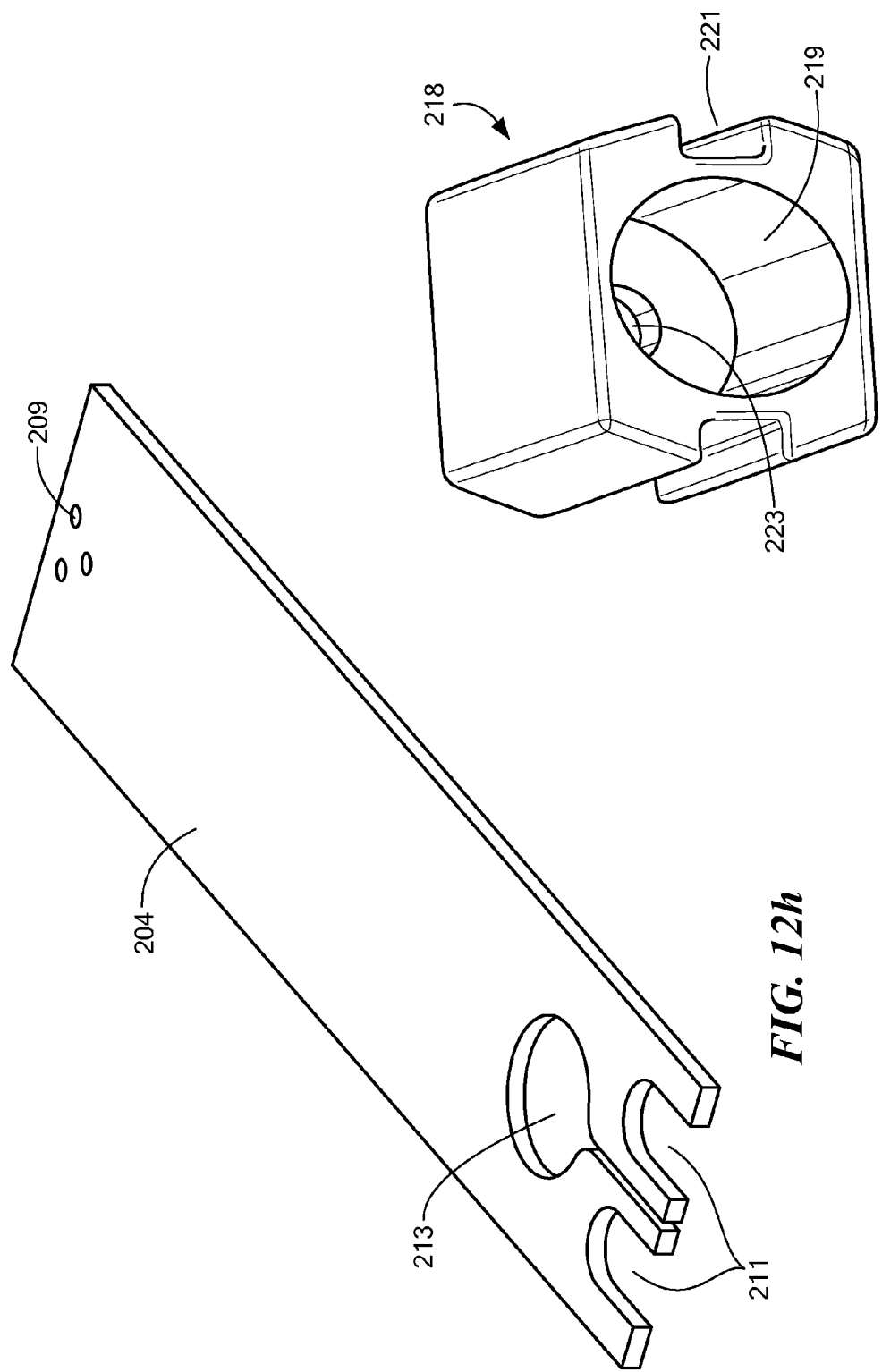

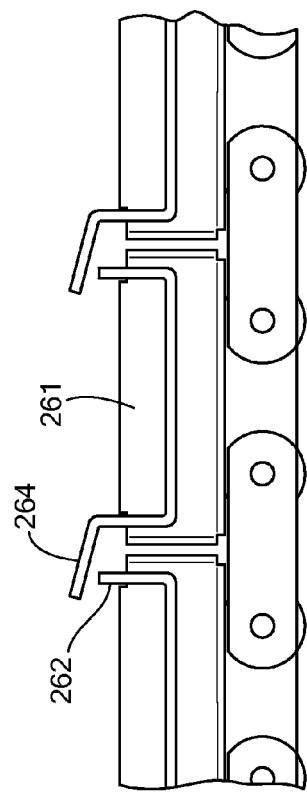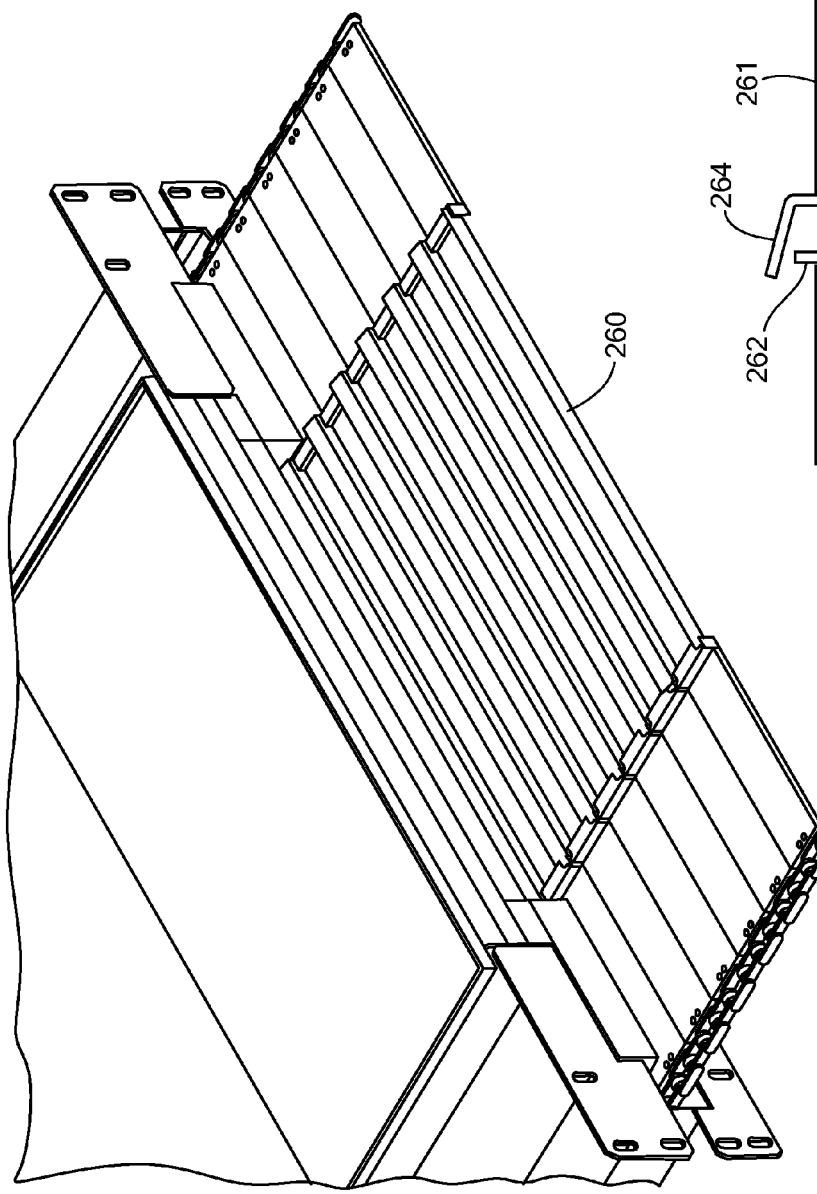

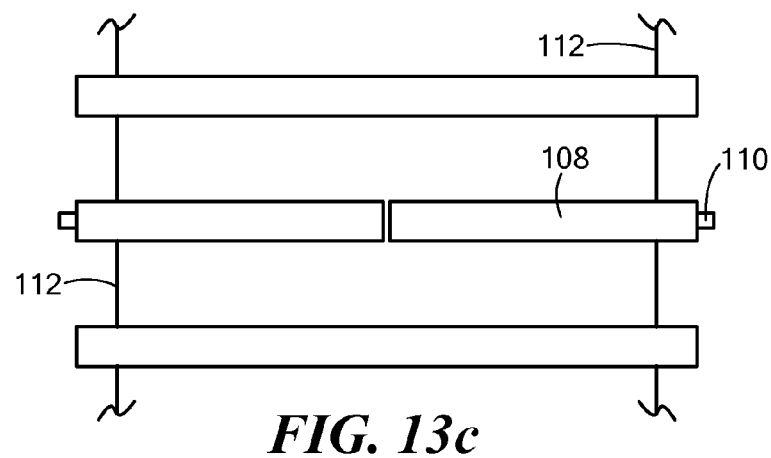
FIG. 13c
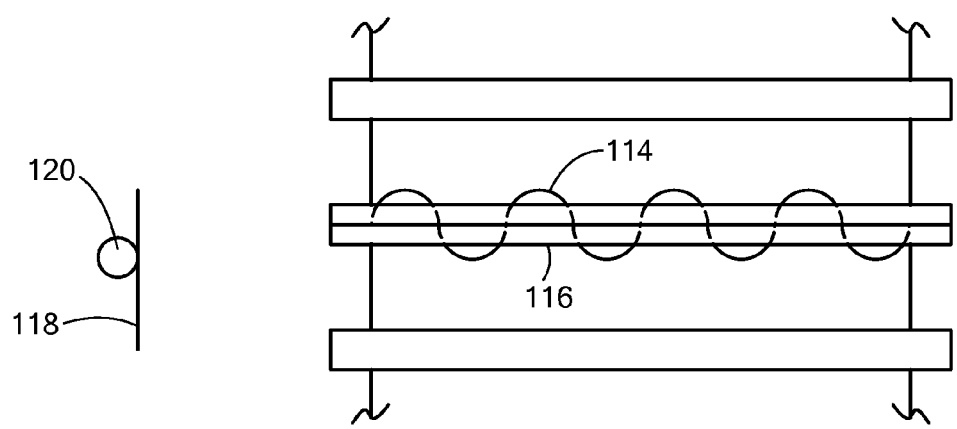
FIG. 13f  FIG. 13d
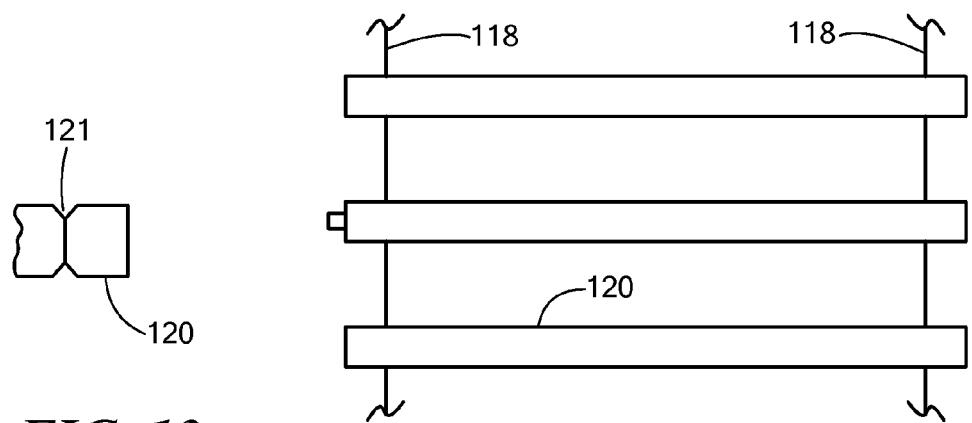
FIG. 13g  FIG. 13e

HIGH TEMPERATURE CONVEYOR BELT

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Conveyor belts are widely known and employed for the transport of a work product through a furnace for thermal processing of the work product. Woven metal belts are known for use in high temperature furnaces and for many purposes are acceptable. For some purposes however, metal belts are not suitable due to the tendency of the metal to scratch or mar the surface of some types of product being carried on the belt through the furnace. Panel displays such as used in computer tablets and solar cell wafers have a highly polished surface which is especially prone to scratching and abrasion by contact with a metal belt.

It is also desirable to avoid direct contact of a product surface with the metal conveyor as metal contamination can occur which can be deleterious to the product. For example, in the processing of solar cell wafers, contaminants from the metal can be transferred to the wafer and can be diffused into the wafer under the high temperature conditions of the furnace.

It would be desirable to provide a conveyor belt for use in high temperature furnaces which can carry such products and which will not adversely affect the product or product surface.

BRIEF SUMMARY OF THE INVENTION

The invention comprises a high temperature conveyor belt having a non-metallic conveying surface which will not scratch, abrade or otherwise mar the surface of a product being carried on the belt through a furnace and which will not contaminate the product. In one embodiment, the conveyor comprises a high temperature fabric belt attached to a metal belt which may be a conventional woven metal conveyor belt. The product is carried on the non-metallic fabric belt. In another embodiment, the conveyor is composed of a non-metallic high temperature strand, such as a rope, fabric or tow, which is woven or threaded through a metal belt to provide a non-metallic conveying surface on which the product is supported for transport through the furnace.

In a further embodiment, the non-metallic product support elements are coupled to roller chains at each side of the furnace chamber and which are cooperative with a drive mechanism to transport the conveyor through the furnace. The roller chains can be located outside of the furnace chamber to avoid exposure to the high temperature of the furnace chamber.

BRIEF DESCRIPTION OF THE SEVERAL VIEWS OF THE DRAWINGS

The invention will be more fully described in the following detailed description in conjunction with the drawings in which:

FIG. 4b is an exploded view showing the elements of the embodiment of FIG. 4a;

FIGS. 4c, 4d and 4e are top, elevation, and end views respectively of the embodiment of FIG. 4a;

FIG. 10a is a top view of another embodiment using stainless steel cross rods between upper and lower fabric belt layers;

FIG. 10b is a side view of the cross rods of FIG. 10a stitched into pockets;

FIG. 10c is a side view of the stainless steel cables of FIG. 10a stitched into pockets;

FIG. 12h is a perspective view of an end strip;

FIG. 12i is a perspective view of a coupling;

FIG. 12o is another embodiment having powder trays for product support;

FIG. 12p is a side view of the embodiment of FIG. 12o illustrating the powder trays.

FIG. 13c is an embodiment like FIG. 13a having tubes fitted over a rod;

FIG. 13d is a rope ladder embodiment having a silicon carbide rope woven through a split rod;

FIGS. 13e, 13f and 13g show a rope ladder embodiment in which each side rope is looped around a groove in the support rods.

DETAILED DESCRIPTION OF THE INVENTION

This application is related to U.S. Non-Provisional patent application Ser. No. 14/038,012, entitled High Temperature Conveyor Belt, filed on Sep. 26, 2013 and U.S. Provisional Patent Application No. 61/707,230, entitled "High Temperature Fabric Conveyer Belt" filed Sep. 28, 2012 each of which are herein incorporated by reference in its entirety for all purposes.

Figure 1:
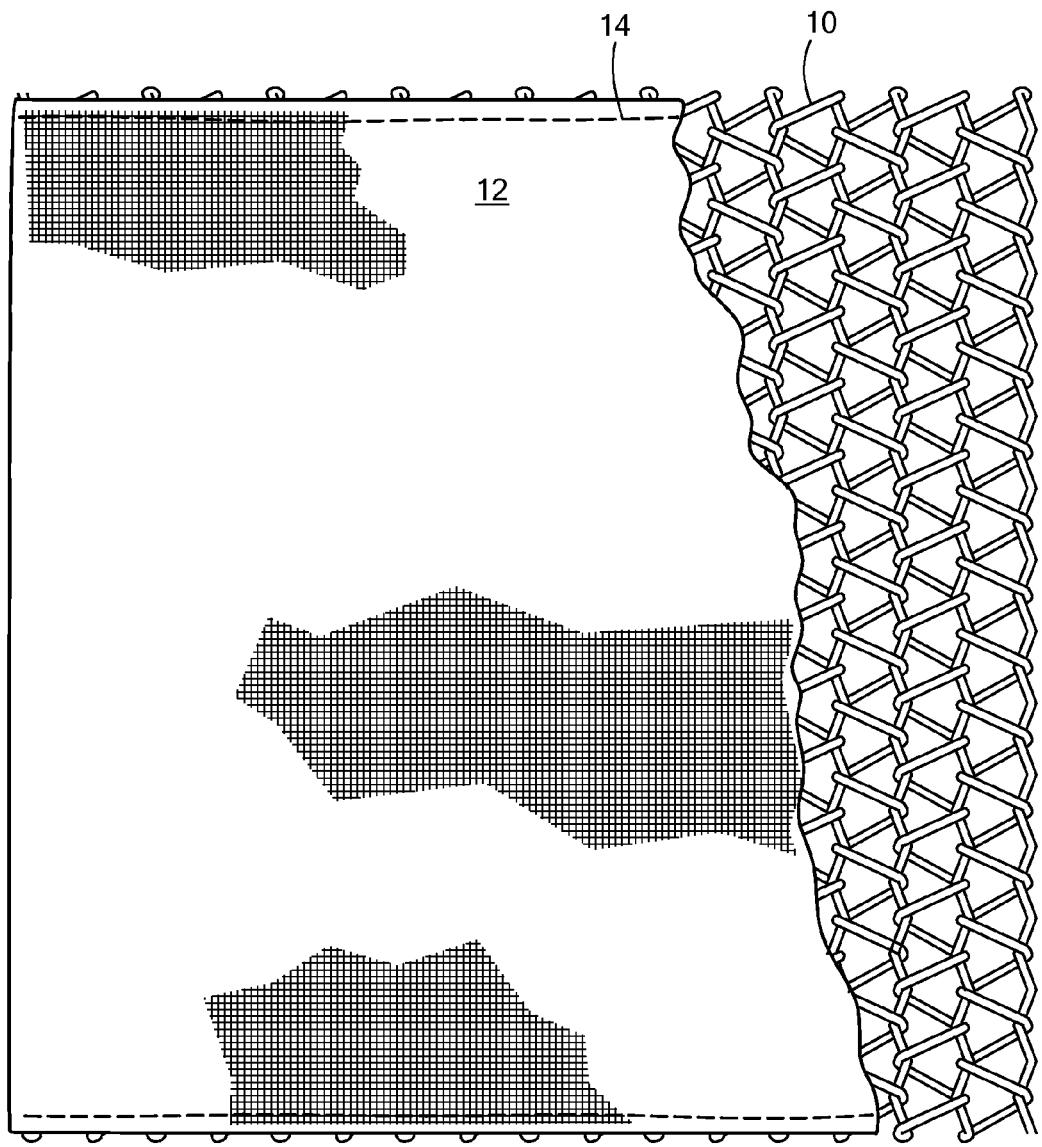
FIG. 1 shows a cutaway perspective view of one embodiment of the invention.

One embodiment of the invention is shown in FIG. 1 which includes a woven metal belt 10 having attached on the top or upper surface thereof a high temperature non-metallic fabric belt 12. The fabric belt is made of woven silica in the present embodiment but can be made of other high temperature materials in woven and non-woven form. Any material is suitable which can withstand the processing temperatures of the furnace in which the conveyor belt is used, which can typically be up to 1200° C., and which has material characteristics to prevent scratching, marring or other contamination of the product surface. The metal belt 10 can be of conventional construction. The fabric belt 12 is attached to the metal belt 10 by any suitable means such as stitching 14 along respective side edges of the fabric belt.

Figure 2:
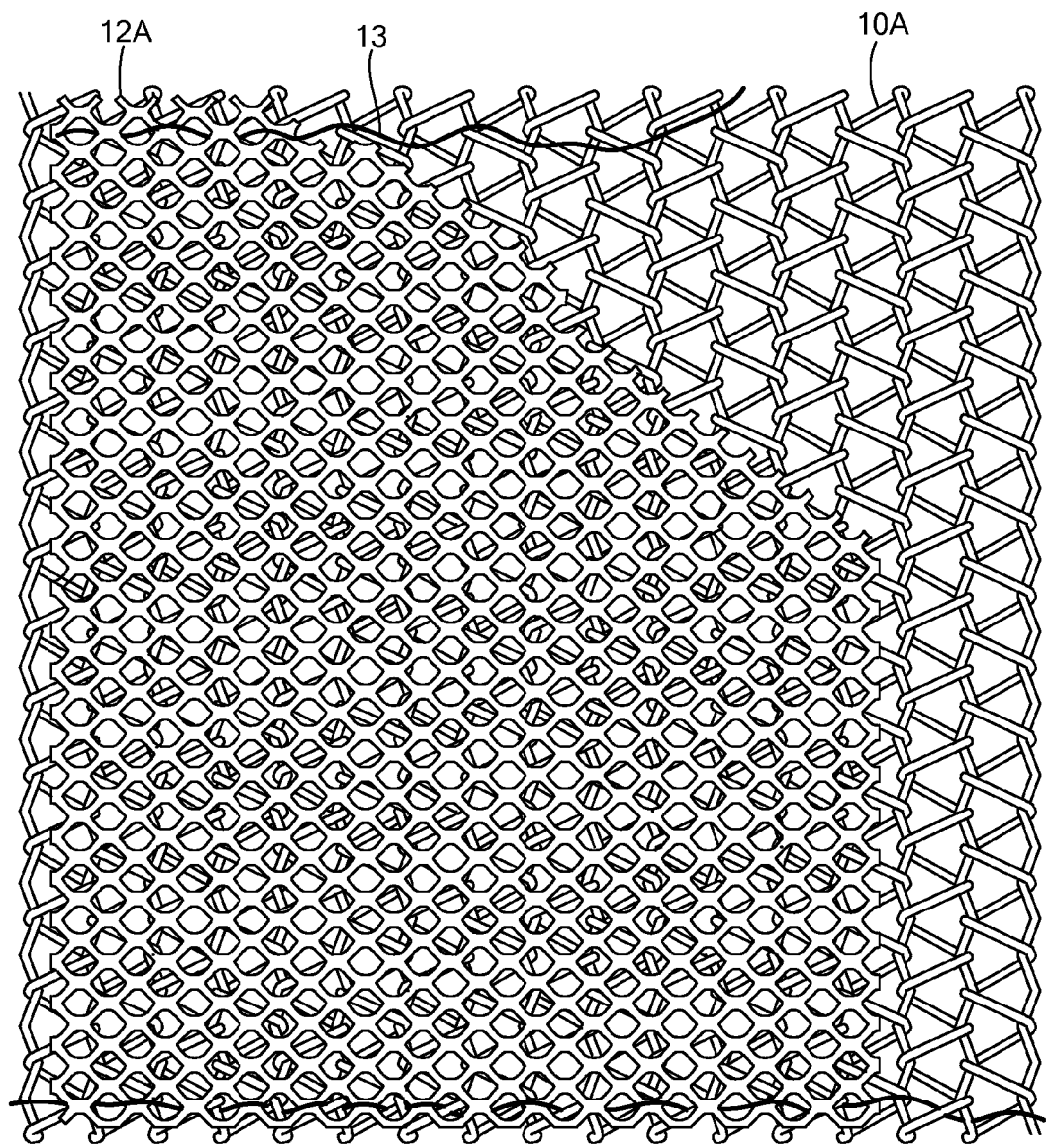
FIG. 2 is a cutaway perspective view of a second embodiment of the invention.

Another embodiment is illustrated in FIG. 2 in which the non-metallic material is a molded or woven belt 12A attached to metal belt 10A. The non-metallic belt 12A is attached to metal belt 10A by ropes or strands 13 on each side of the belt and which are threaded through the metal and non-metal belts.

The metal belt serves to support the non-metallic fabric belt or strand and allows use of the fabric in the high temperature environment of the furnace for a longer working life than could be possible for a fabric used alone. The fabric used alone would not support the overall weight of multiple panels or other such products transported through the furnace. Nor would the fabric alone withstand the tensile forces of transport through the furnace.

Figure 3:
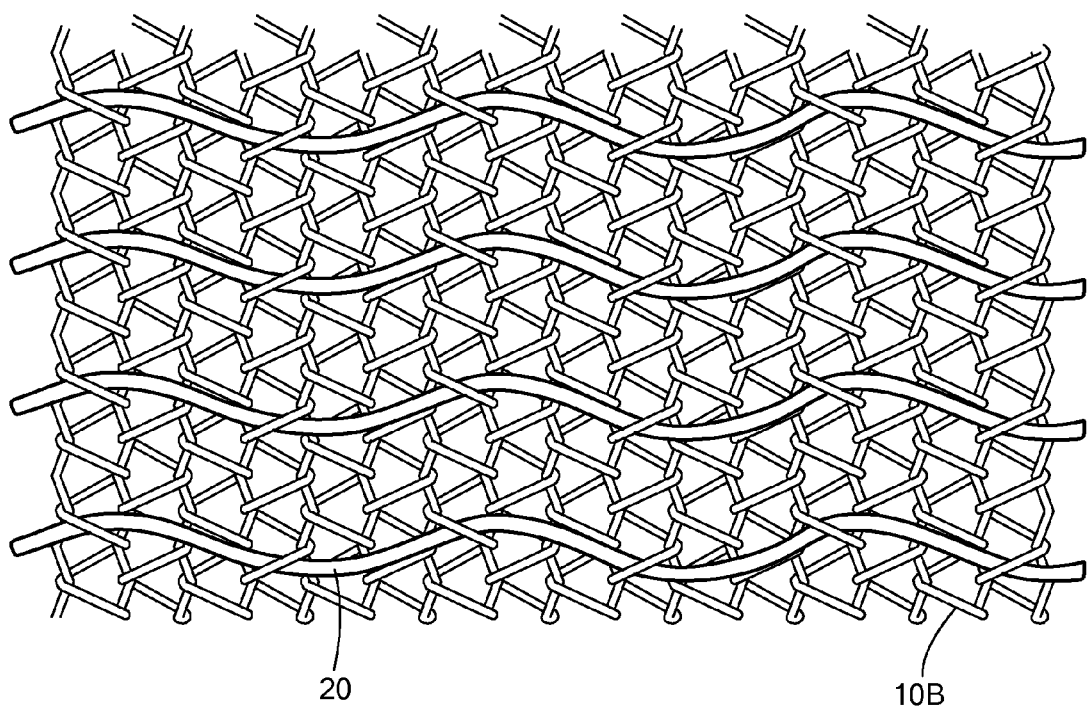
FIG. 3 shows another embodiment of the invention.

A further embodiment of the invention is illustrated in FIG. 3. This embodiment comprises a metal belt 10B through which is threaded a non-metallic high temperature strand 20 which provides a conveying surface for the product supported thereon for transport through the furnace. The strand can comprise a rope, fabric or tow of silica, silicon carbide, or other high temperature material which will not scratch or otherwise mar or contaminate the product surface.

Figure 4A:
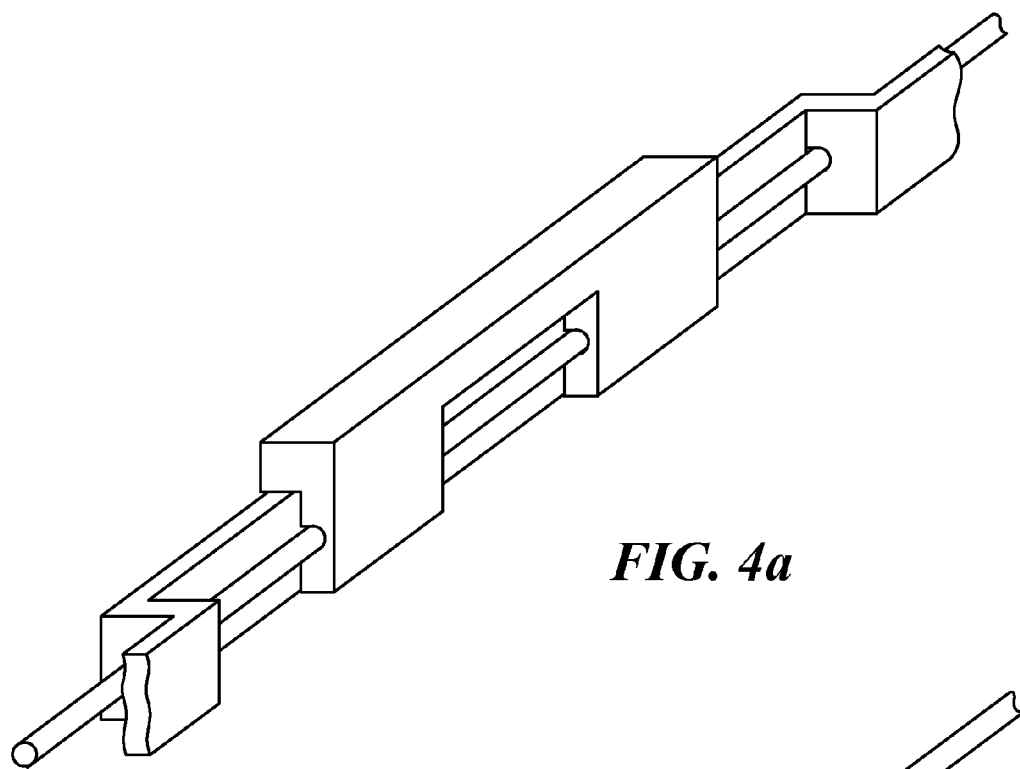
FIG. 4a is a perspective view of another embodiment.
Figure 4B:
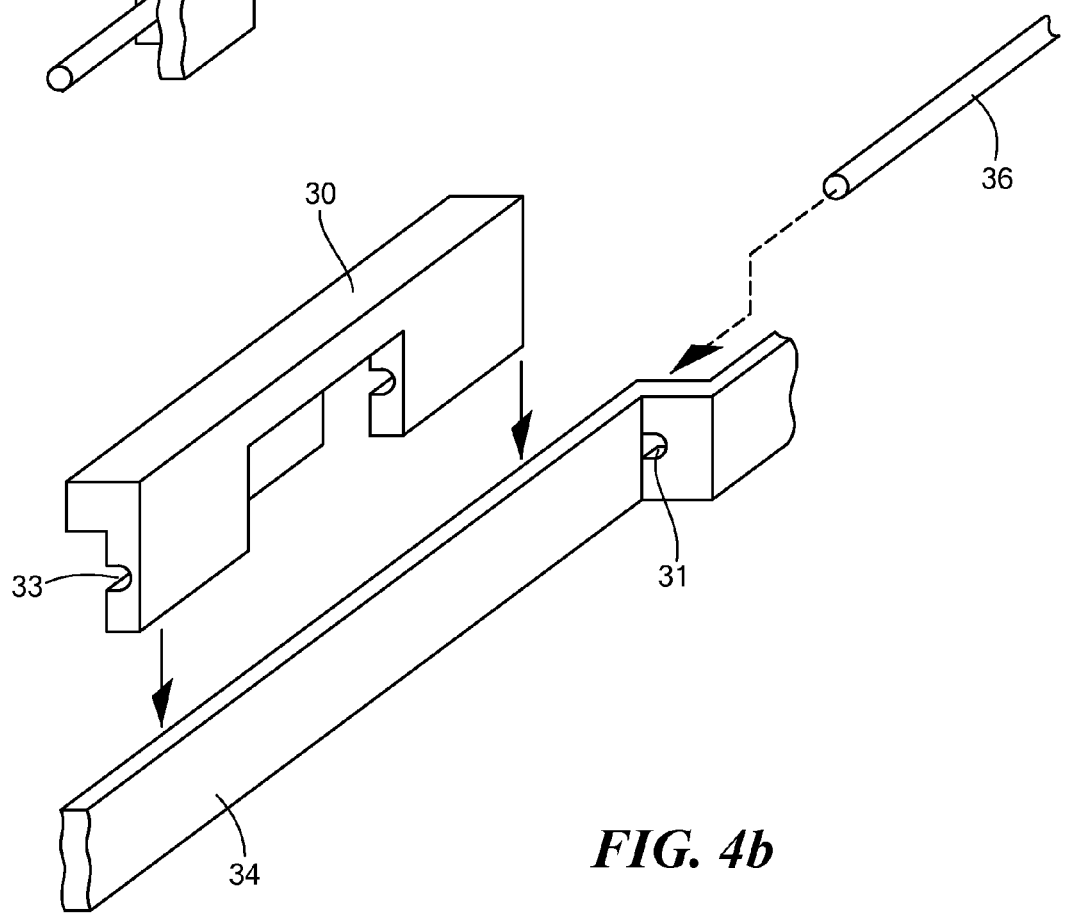
Figure 4E:
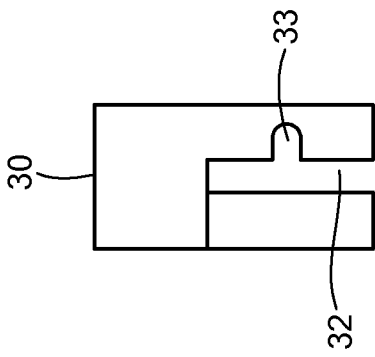
Figure 4C:
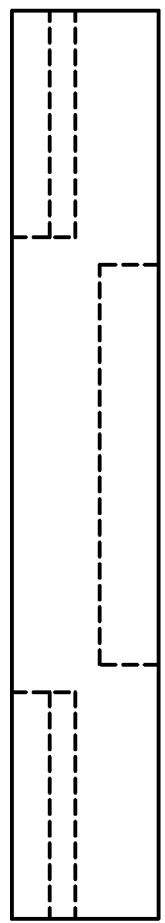
Figure 4D:
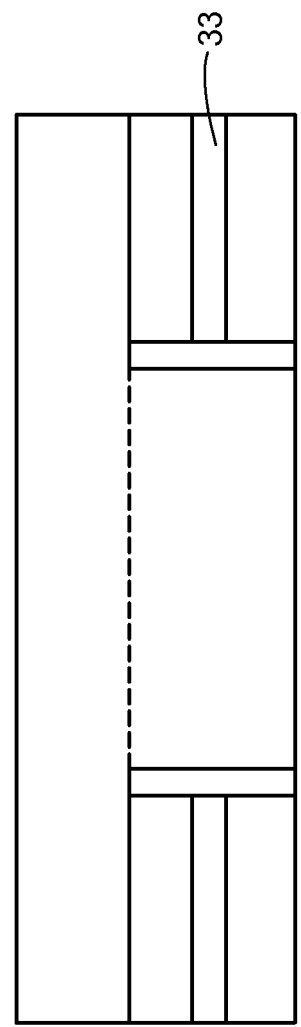
Figure 4F:
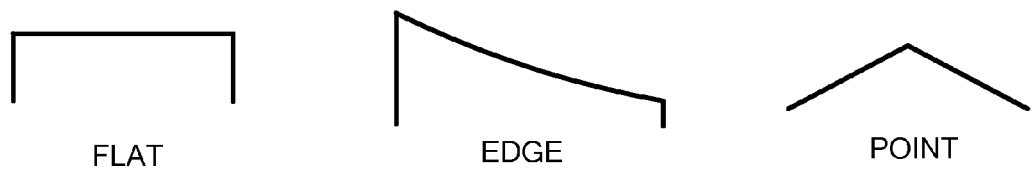
FIG. 4f is a diagrammatic elevation view of alternative standoff configurations.

Another embodiment is shown in FIGS. 4a-4f. Non-metallic standoffs are attached in spaced disposition to a flat wire type metal belt. The standoffs provide a non-metallic support surface on which the product is supported. The standoffs are fabricated of ceramic or other suitable material and are configured to be attached to links or elements of the metal belt. In one implementation shown in FIGS. 4a-4f, the ceramic standoff 30 has a slotted area 32 which is slidable onto the flat link or element 34 of the belt. After installation of the standoff on the belt link, a locking rod 36 can be inserted as shown between openings 31 in the link 34 and in grooves 33 in the standoff 30 to lock the spacer to the belt link. The top profile of the standoff 30 can have different shapes as shown in FIG. 4f as examples to provide different types of contact with a product surface resting thereon. The contact with the product can be a line contact or point contact for example, and the point shape in FIG. 4f can be sloped on four sides like a pyramid.

Figure 4G:
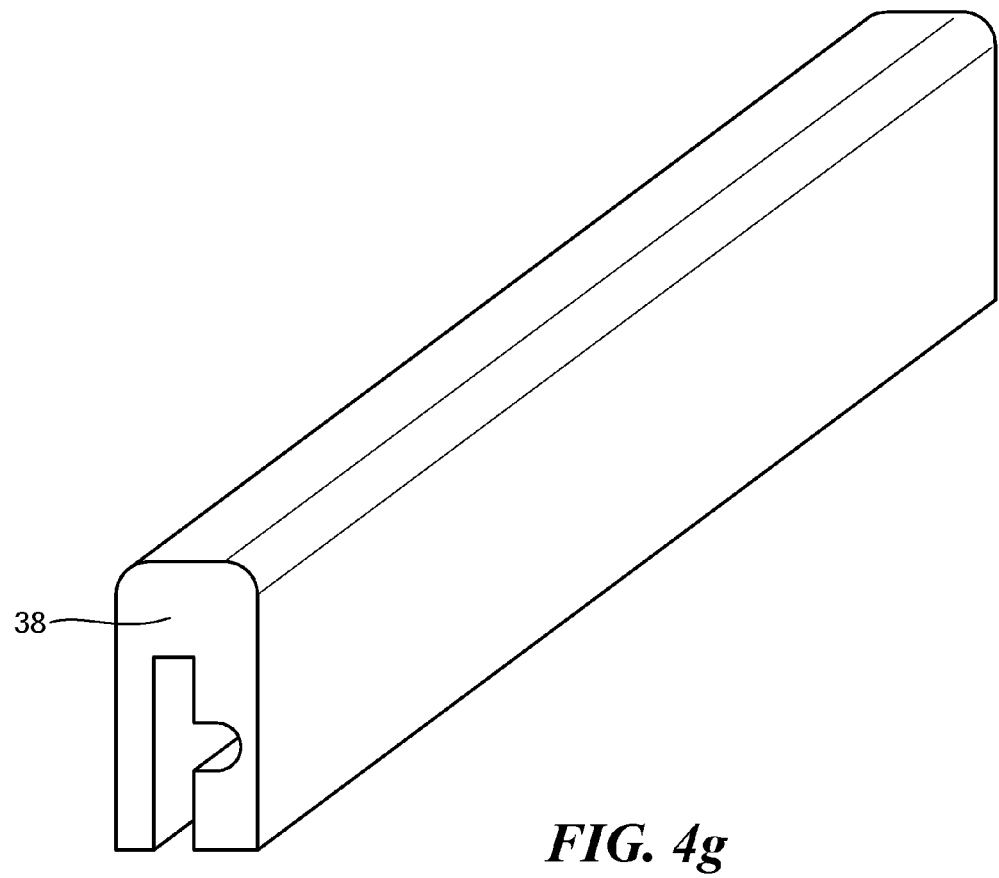
FIG. 4g is a perspective view of an extruded stand-off.

The standoffs can be molded of a ceramic or other suitable material. Alternatively, the standoffs can be extruded as shown in FIG. 4g in which body 38 is of an extruded shape that can be cut to an intended length. The extruded body is attached to a flat link or element of the belt by a locking rod inserted in the link and in grooves in the standoff as described above.

Figure 5:
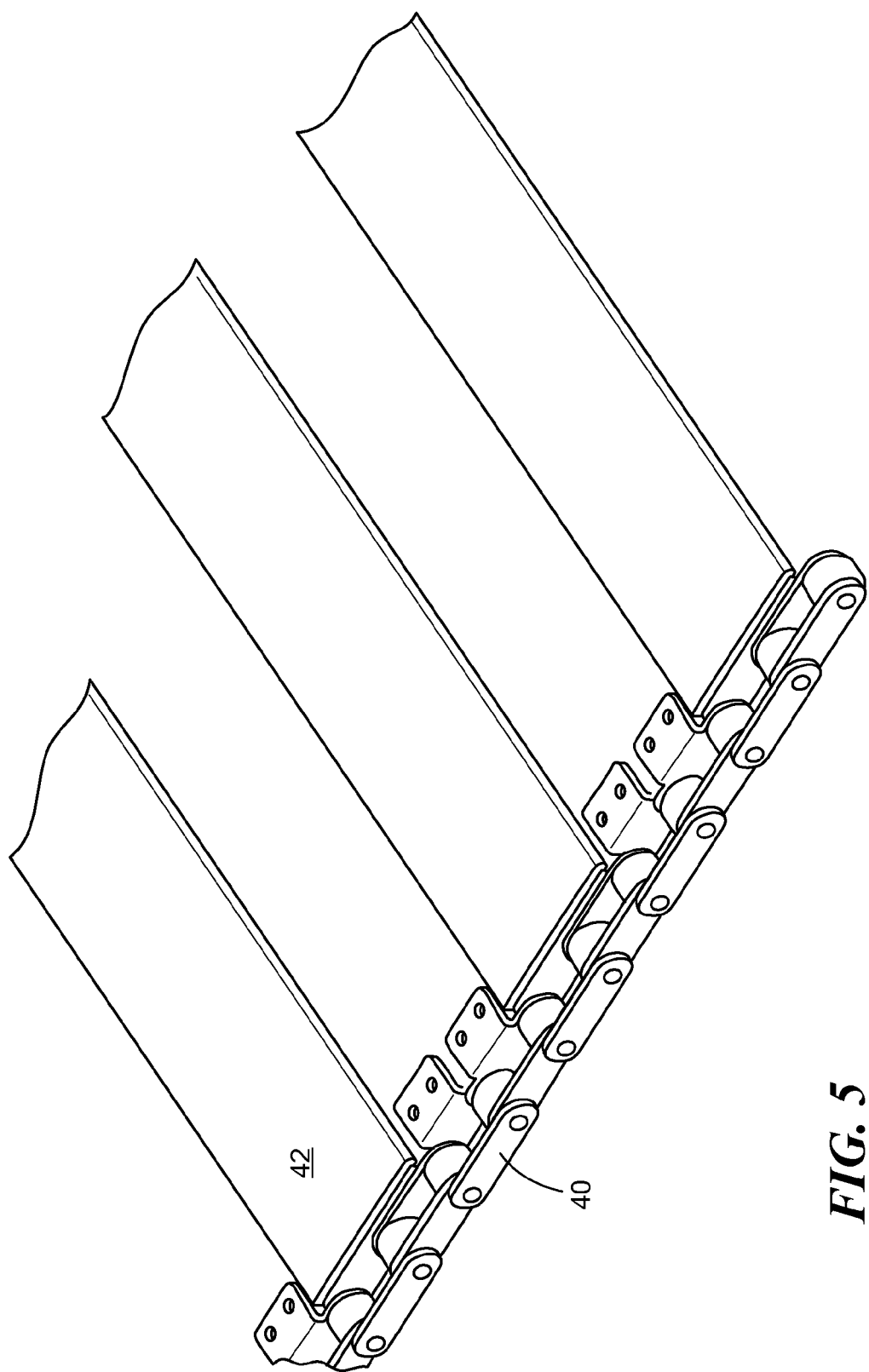
FIG. 5 is a cutaway perspective view of an embodiment of the invention using roller chains.
Figure 6:
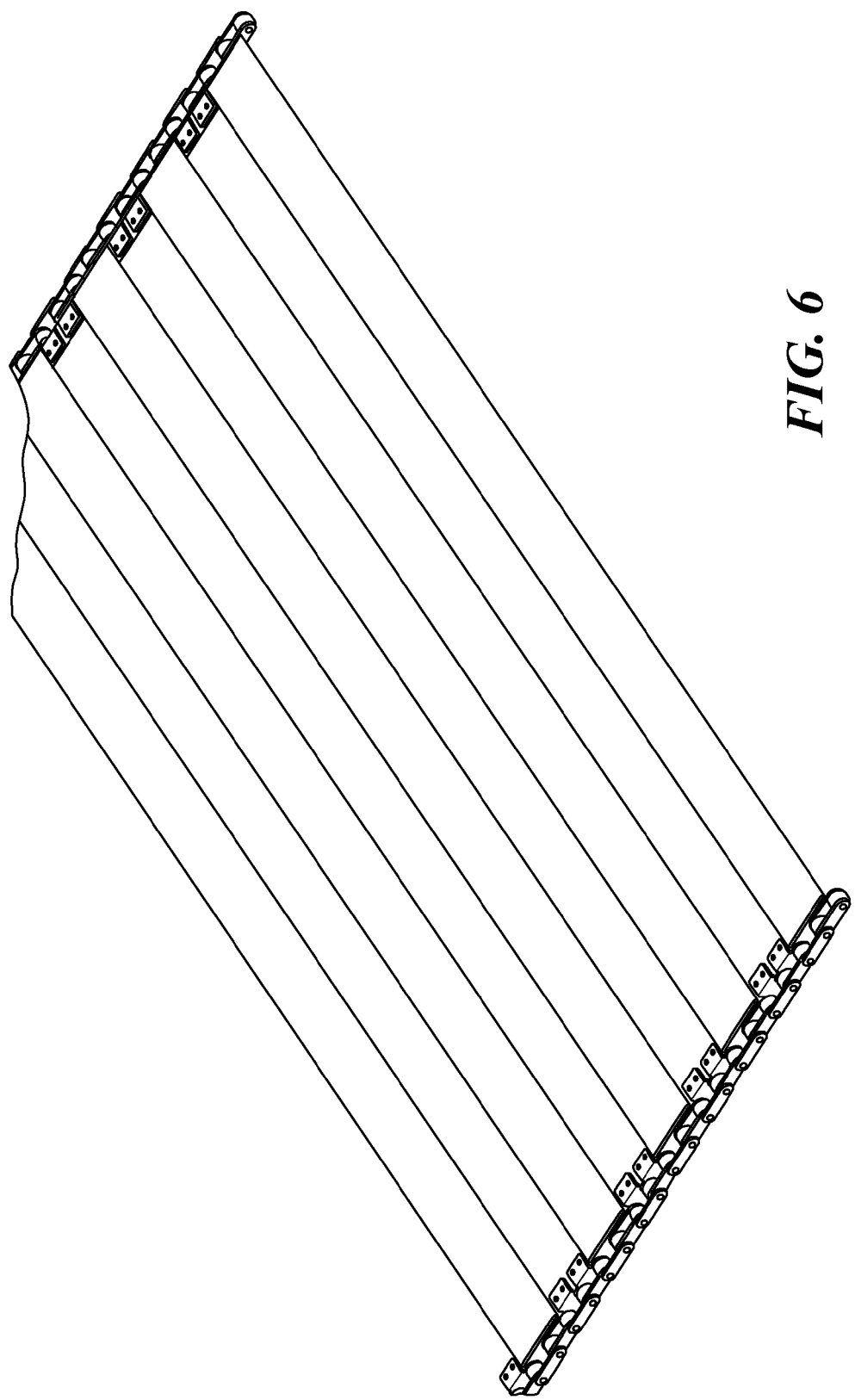
FIG. 6 is another cutaway perspective view of the roller chain embodiment of FIG. 5.
Figure 7:
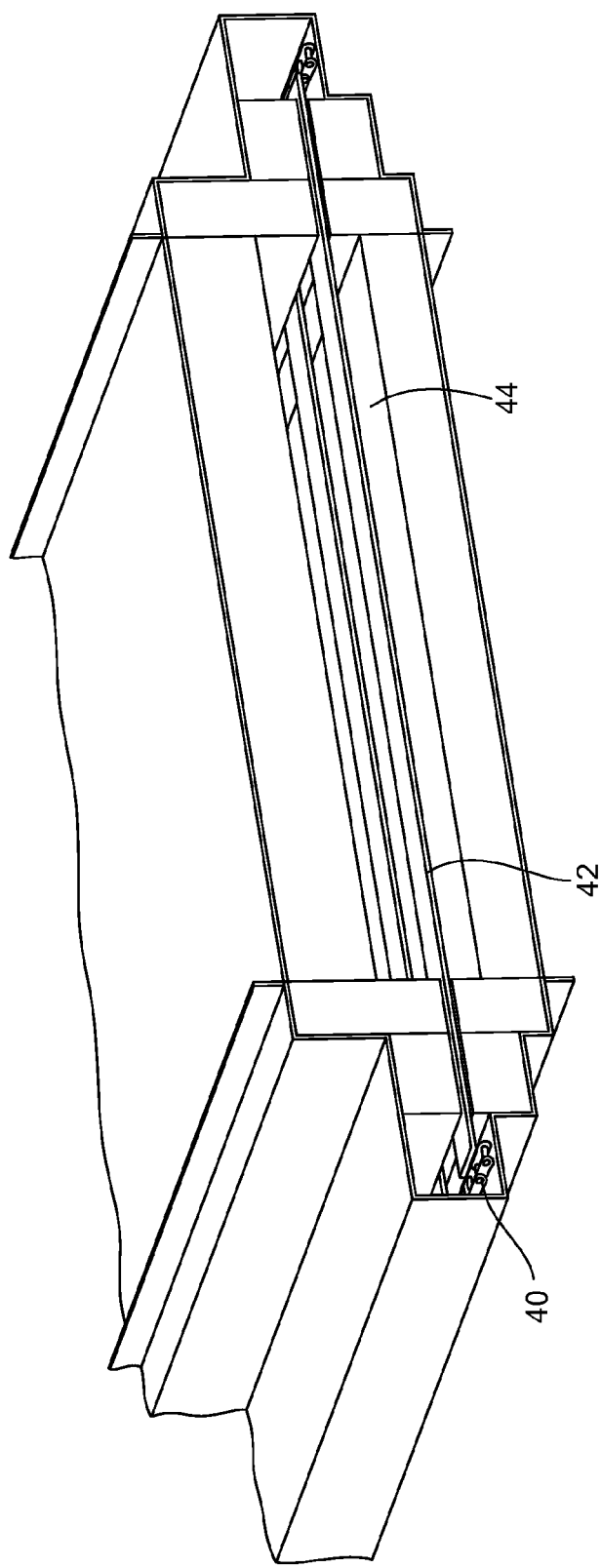
FIG. 7 is a cutaway view of the roller chain embodiment of FIGS. 5 and 6 disposed in a furnace.
Figure 8:
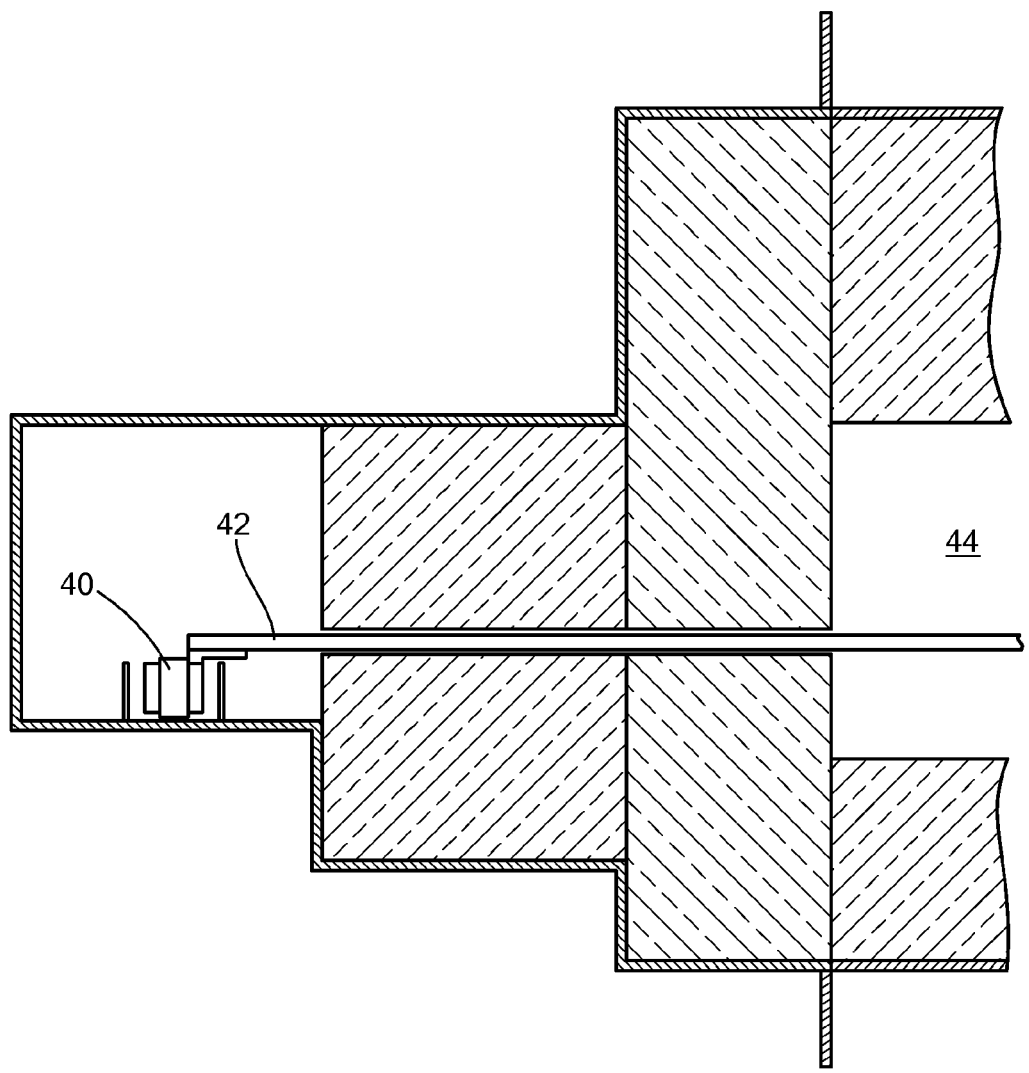
FIG. 8 is a cross-section view of a portion of the furnace of FIG. 7.

A further embodiment is shown in FIGS. 5 and 6. A roller chain 40 is provided on each side of the conveyor with product support elements 42 extending between and connected to the roller chains at respective ends of the support elements. The product supports are of a non-metallic material or have non-metallic coatings on a metallic base. These materials for example are mica, neoceram, ceramics, composites, ceramic coated metals and the like. The product supports can also be of various shapes. Thin flat strips are shown in FIG. 5 but can be of other shapes such as rods, full decking, spaced out supports, etc. The roller chains 40 are disposed outside of the furnace chamber 44 as illustrated in FIGS. 7 and 8. The product supports 42 extend across the width of the chamber 44 and through openings in the side walls of the furnace as shown. The roller chains are coupled to sprocket of a drive mechanism for transporting the conveyor through the furnace.

Figure 9:
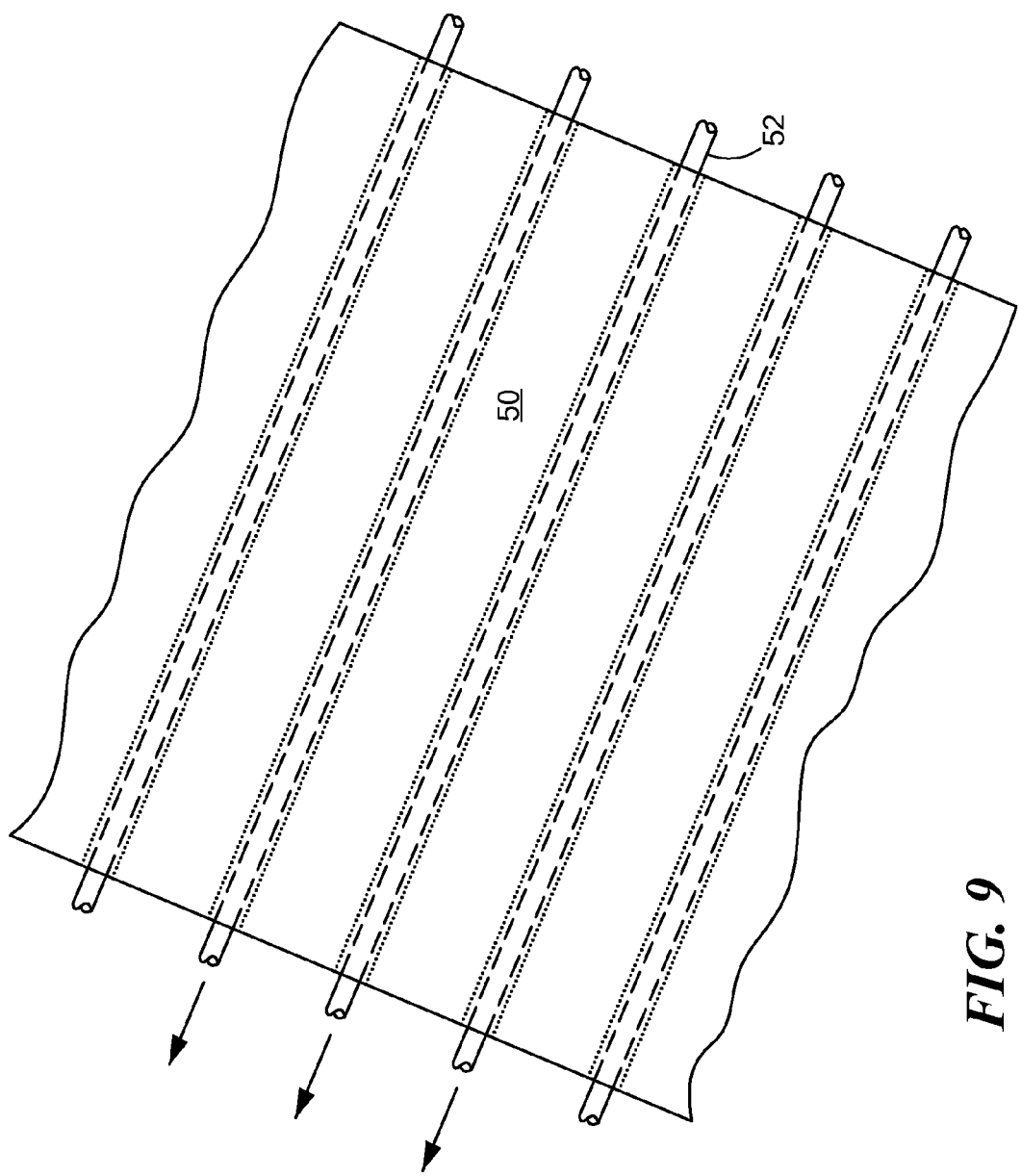
FIG. 9 shows another embodiment using a silicon carbide ceramic tow.

Another embodiment is shown in FIG. 9 which comprises a fabric belt 50 having integrated therein silicon carbide tows 52 disposed longitudinally along the belt and retained on the underside of the conveying surface in stitched pockets.

Figure 10D:
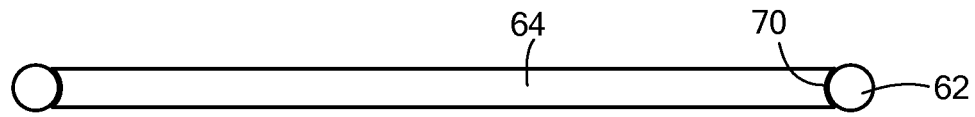
FIG. 10d is a side view of an alternative embodiment in which the cross rods are shaped to conform to the cables.
Figure 10E:
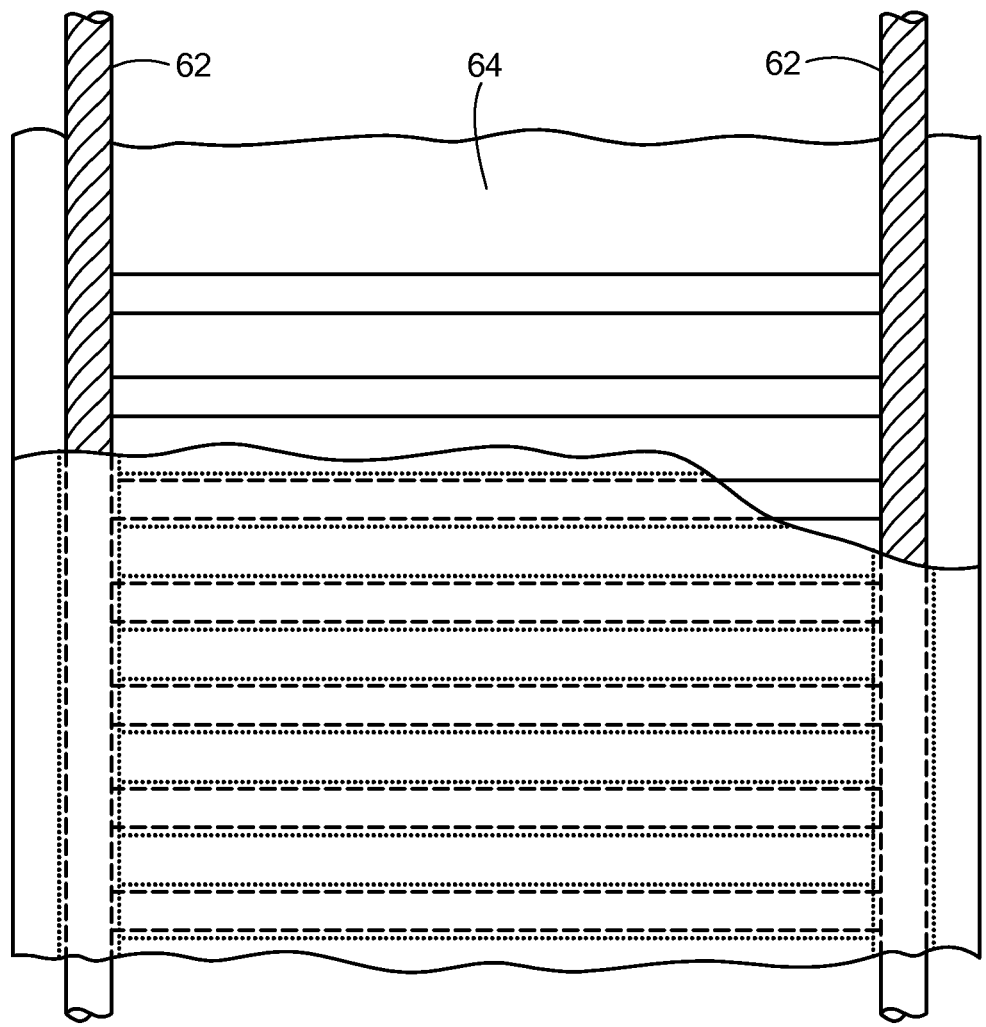
FIG. 10e is a top view of a belt formed with top and bottom layers.

A further embodiment is shown in FIGS. 10a-10c. A fabric belt 60 has longitudinally stainless steel cables 62 on the respective sides thereof and between which are disposed stainless steel cross rods 64. As seen in FIG. 10b, the cross rods are stitched into pockets 66 provided on the bottom (non-conveying) surface of the fabric for example. The stainless steel cables 62 can also be retained within pockets 68 provided on the sides of the fabric as illustrated in FIG. 10c. The cross rod ends 70 can be shaped to conform to the confronting side portions of the cables as shown in FIG. 10d.

In an alternative construction, the fabric belt can be composed of top and bottom layers with pockets stitched or otherwise formed in the bottom layer, as shown in FIG. 10a to retain the cross rods 64 and side cables 62.

In assembling the belt into a continuous loop, the side cables are cut to length and joined by a ferrule or other suitable connector. The belt ends are stitched together or otherwise connected.

Figure 11:
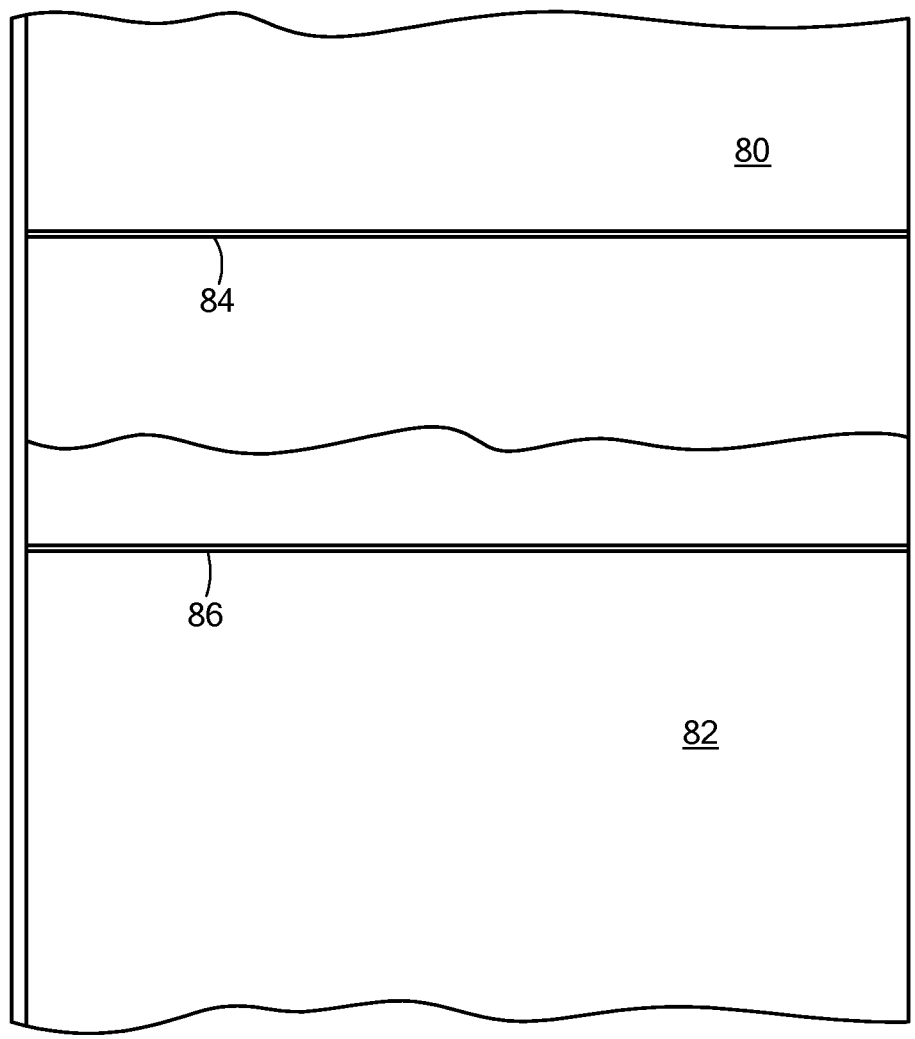
FIG. 11 shows views of yet another embodiment having a fabric belt linked together with offsetting seams.

In the embodiment of FIG. 11, a fabric conveyor belt is provided having two or more fabric layers 80 and 82 to provide a thicker belt. The belt ends of each layer are staggered so that the seams in each layer are offset from each other along the length of the belt. In FIG. 11, the second ends 84 of the layer 80 are offset from the seamed ends 86 of lower layer 82. Offsetting the ends allows the side edges to be lined up and maintained parallel while making the joint, which would be more difficult with a butt joint.

Figure 12A:
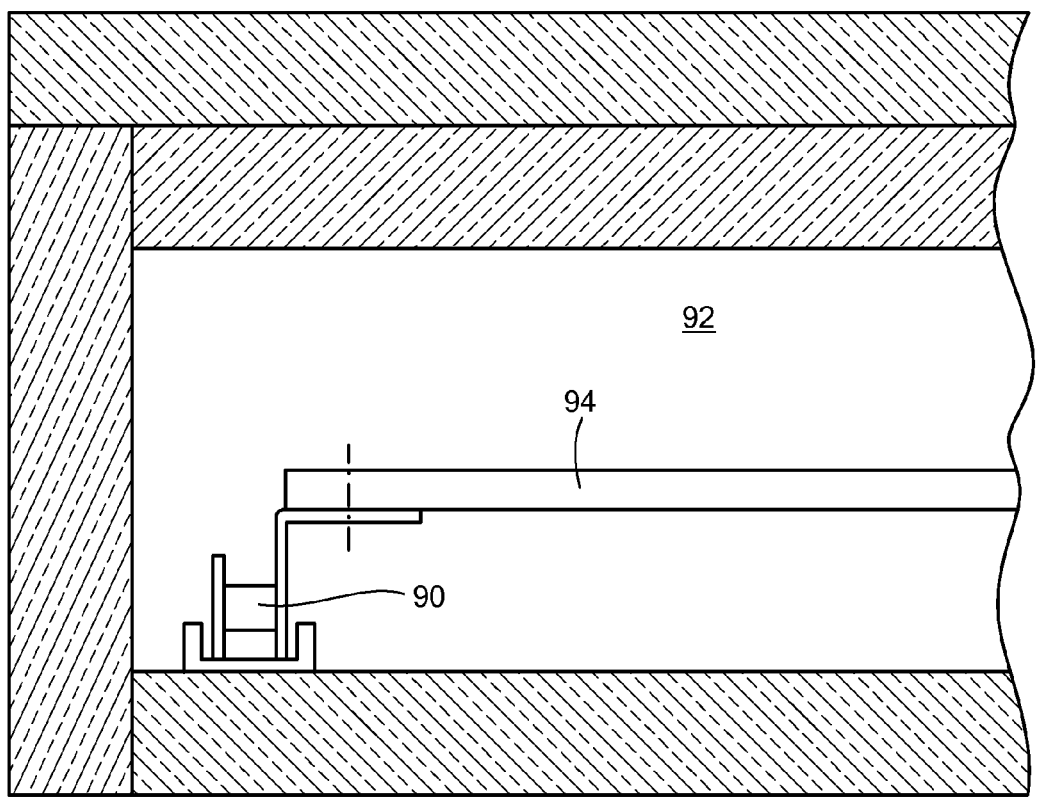
FIG. 12a shows a further embodiment using a chain drive inside the furnace chamber.
Figure 12B:
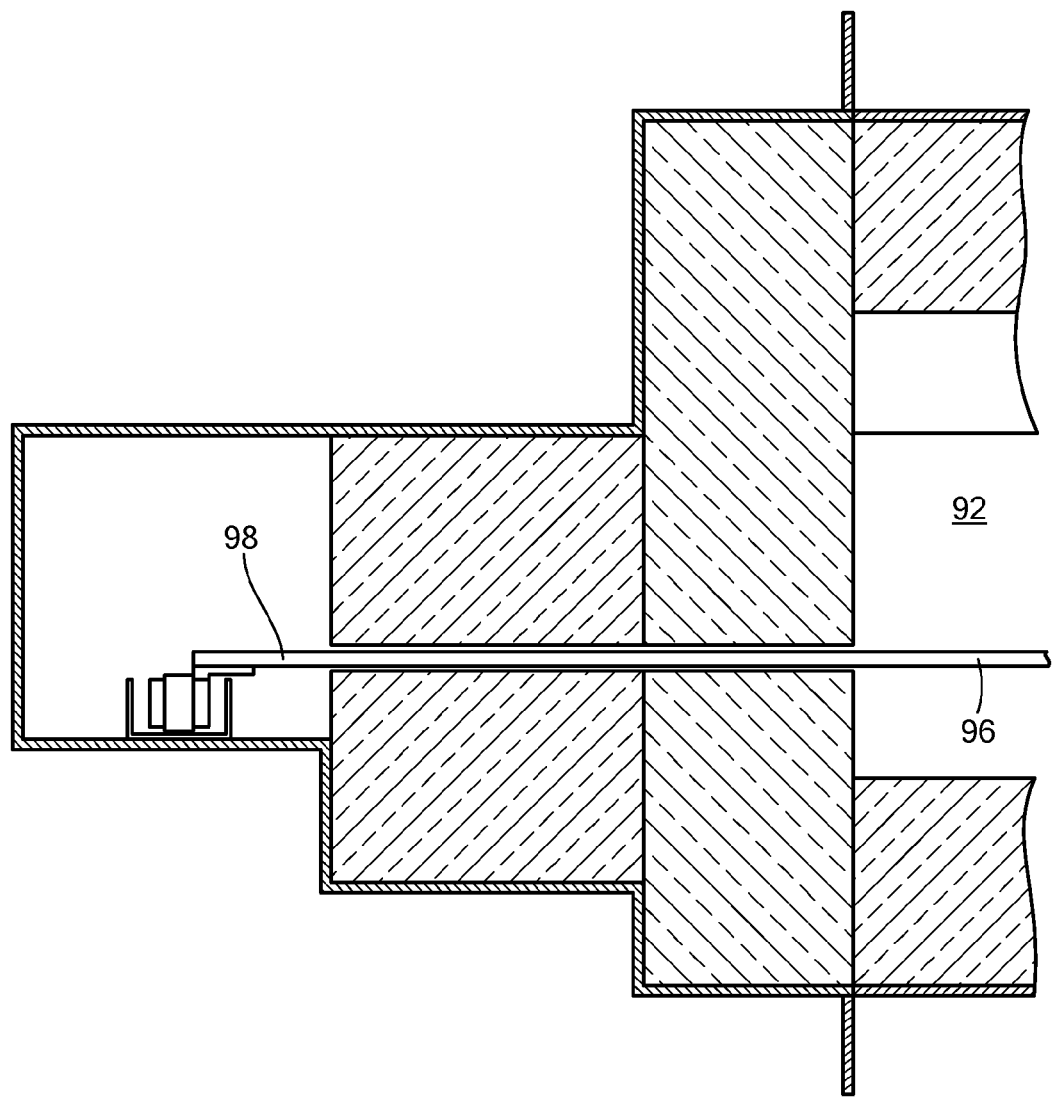
FIG. 12b shows a further embodiment using a chain drive outside the furnace chamber as in FIGS. 7 and 8.

A chain drive embodiment is shown in FIGS. 12*a* and 12*b* and which is similar to the chain drive embodiment shown in FIGS. 5-8. In FIG. 12*a*, the chains are internal to the furnace chamber 92 and have ceramic cross rods 94 or other non-metallic conveying elements or surfaces extending between the side chains. In FIG. 12*b* the chains 90 are outside of the furnace chamber 92 with the conveying elements 96 extending between the chains and across the width of the furnace chamber. In the embodiment of FIG. 12*b*, the conveying elements 96 are thin strips, as in FIG. 5, to fit through narrow side openings 98 in the furnace side walls.

Figure 12C:
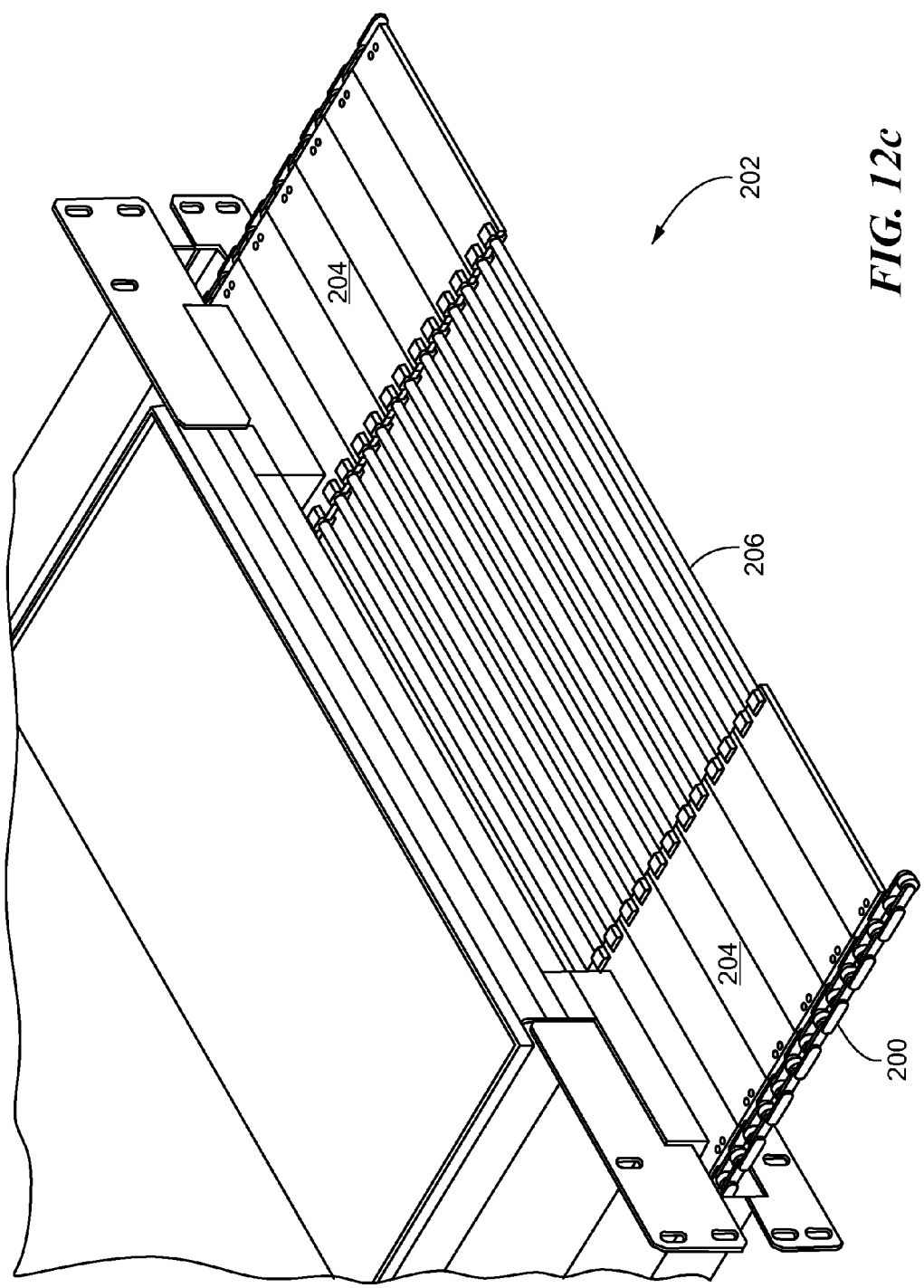
FIG. 12c is a cut away perspective view of a further embodiment using roller chains.
Figure 12D:
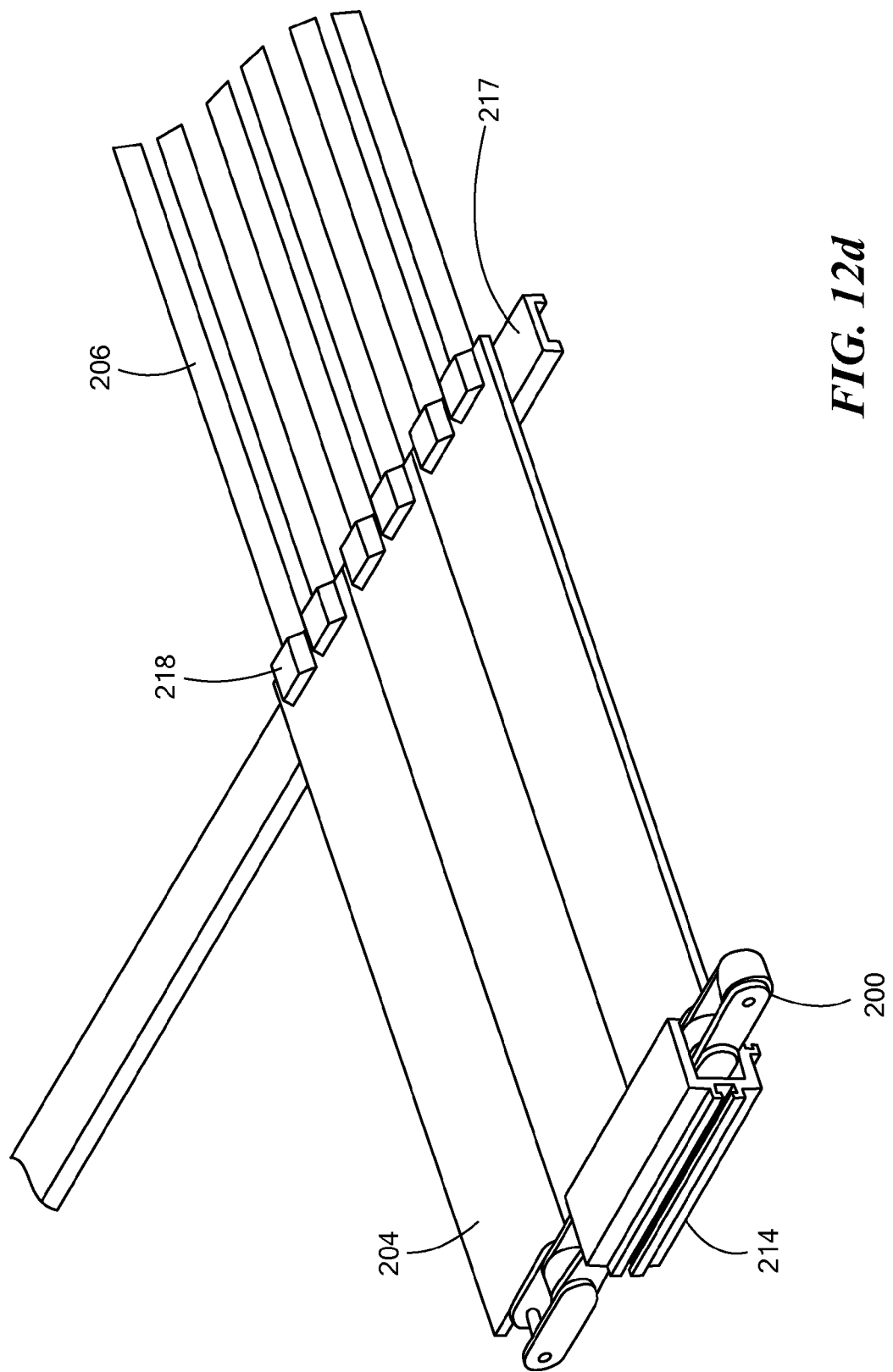
FIG. 12d is a cutaway perspective view illustrating the product support elements and end strips of the embodiment of 12c.
Figure 12E:
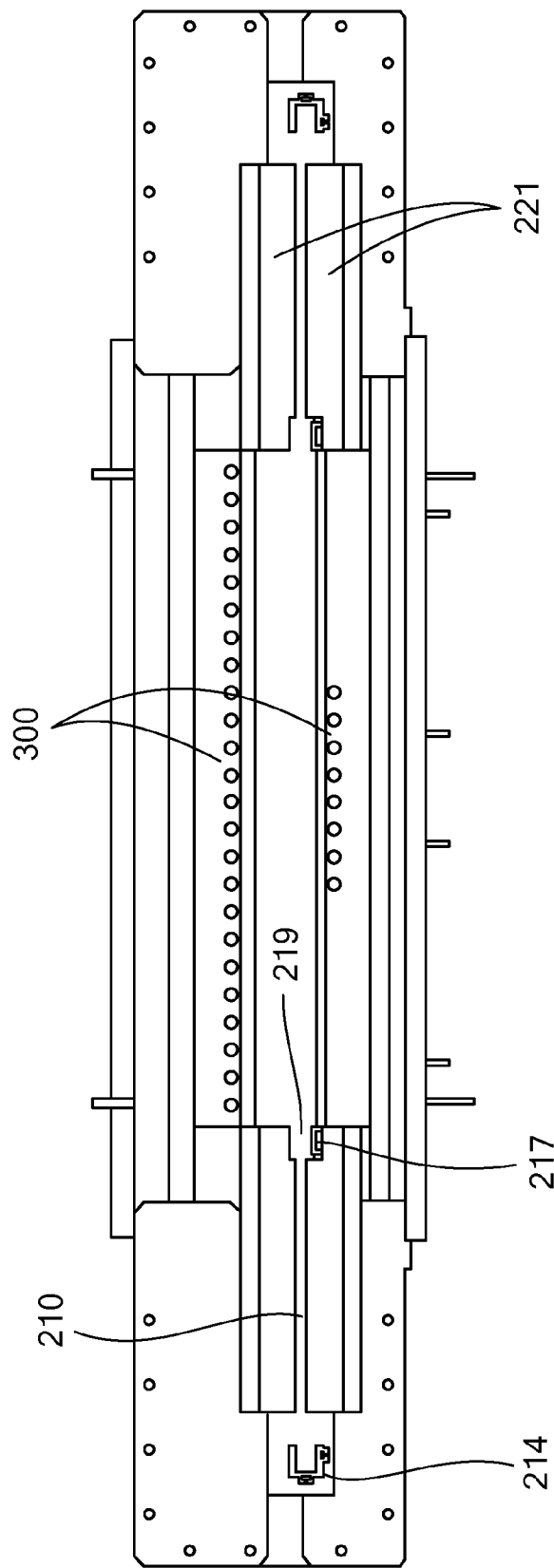
FIG. 12e is an end elevation view of a furnace for accommodating the conveyor belt embodiment of FIG. 12c.

Other chain drive embodiments are shown in FIGS. 12*c*-12*p*. Referring to FIGS. 12*c* and 12*d*, a roller chain 200 is disposed at each side edge of conveyor belt 202. The conveyor is composed of strips 204 each having an outer end coupled to the roller chain and an inner end coupled to product support elements 206 which are disposed in a furnace chamber. As seen in FIG. 12*e*, the strips pass through narrow slits 210 in the side walls 221 which prevent interaction between the atmosphere of the hot furnace chamber and the cooler outer environment. The ceramic strips act as insulation as well as a physical block to substantially prevent air movement through the slits into or out of the furnace chamber. The product support elements in the illustrated embodiment are a plurality of tubes or rods 206 coupled between the respective inner ends of the strips 204 to provide a product support surface. The tubes or rods can for example, be fabricated of a ceramic or silicon carbide material or a ceramic coated metal material. The roller chains and the couplings between the chains and the strips are disposed outside of the hot furnace chamber and therefore are not subject to the heated environment of the furnace chamber. In addition, the roller chains need not be made of a material able to withstand the high temperature of the furnace chamber since the chains located outside of the chamber are not exposed to the high temperature.

Figure 12F:
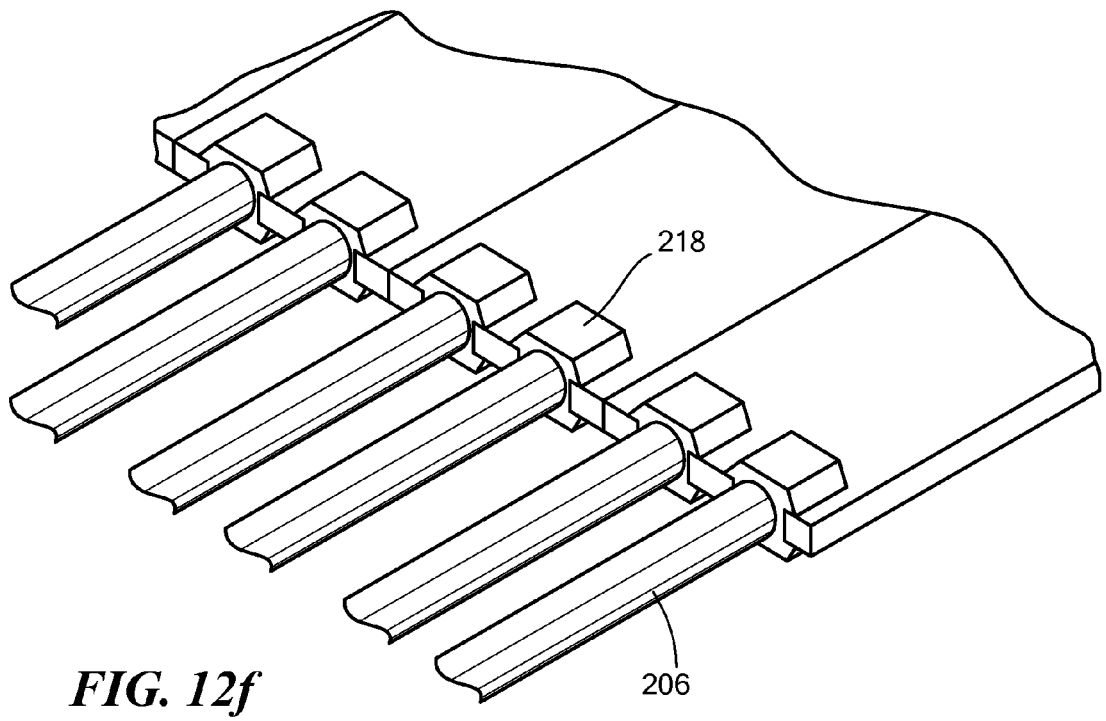
FIG. 12f is a cutaway perspective view illustrating attachment of the support rods to the end strips.
Figure 12G:
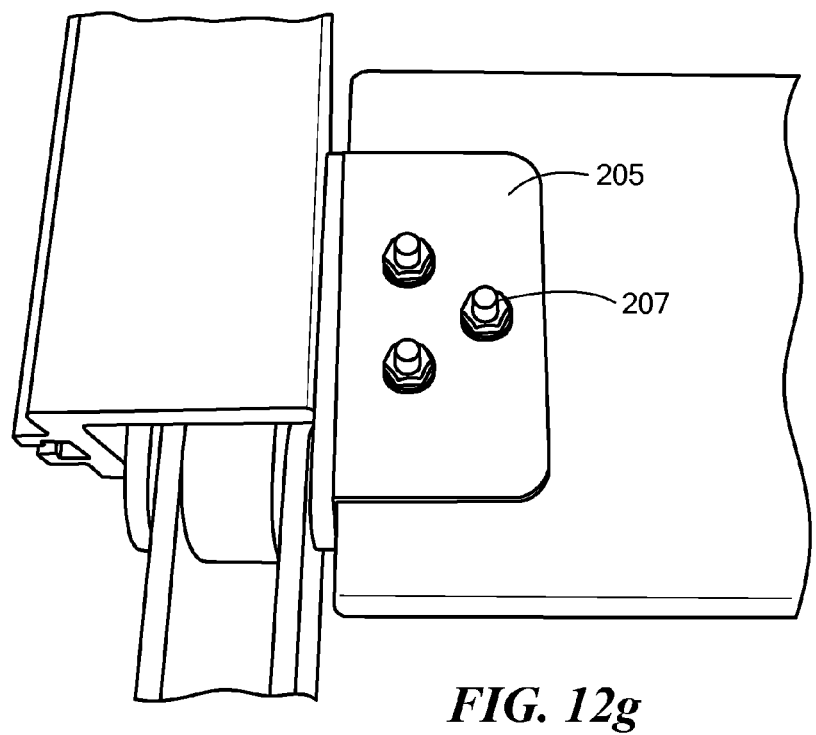
FIG. 12g is a cutaway perspective view illustrating attachment of the end strips to the roller chain.

The roller chains 200 are supported along the length of the furnace on aluminum or other suitable rails 214 as seen in FIGS. 12*d* and 12*e*. These rails are outside of the furnace chamber and therefore need not be of a high temperature material as they are not exposed to the high temperatures in the chamber. The inner ends of the ceramic strips 204 are supported by silicon carbide or other high temperature rails 217 disposed along the length of the furnace chamber in cutouts 219 at respective sides thereof, as seen in FIGS. 12*d* and 12*e*. The strips 204 are connected to the support rods by suitable couplings or fasteners 218 such as alumina sockets, as seen in FIGS. 12*d* and 12*f*. The strips 204 can be, for example, connected to the respective roller chains by plates 205 and fasteners 207 as seen in FIG. 12*g*. The strips 204 are of a width to pass over sprocket wheels which drive the roller chains. In one exemplary embodiment, the strips are two inches wide to pass over a twelve inch diameter sprocket wheel.

One implementation of strip 204 is shown in FIG. 12*h*. The strip is made of a ceramic material and is of generally rectangular shape. One end has openings 209 for accommodating fasteners 207 to attach this end of the strip to a mounting plate 205 which is attached to the chain, as seen in FIG. 12*g*. The other end of the strip has two U-shaped openings 211 and a slotted opening 213 for stress relief. The openings 211 are fitted to couplings 218 which are attached to the support rods 206, as seen in FIG. 12*d*.

The coupling 218 is shown in greater detail in FIG. 12*i*. The coupling or socket is typically made of alumina and has an opening 219 for receipt of an end of support rod or tube 206, and side slots 221 for receipt of the sides of the U-shaped slots 211 of strip 204. A smaller opening 223 is for tooling purposes in fabricating the part. The coupling is secured to the strip 204 and the rod 206 by a slip fit.

Figure 12J:
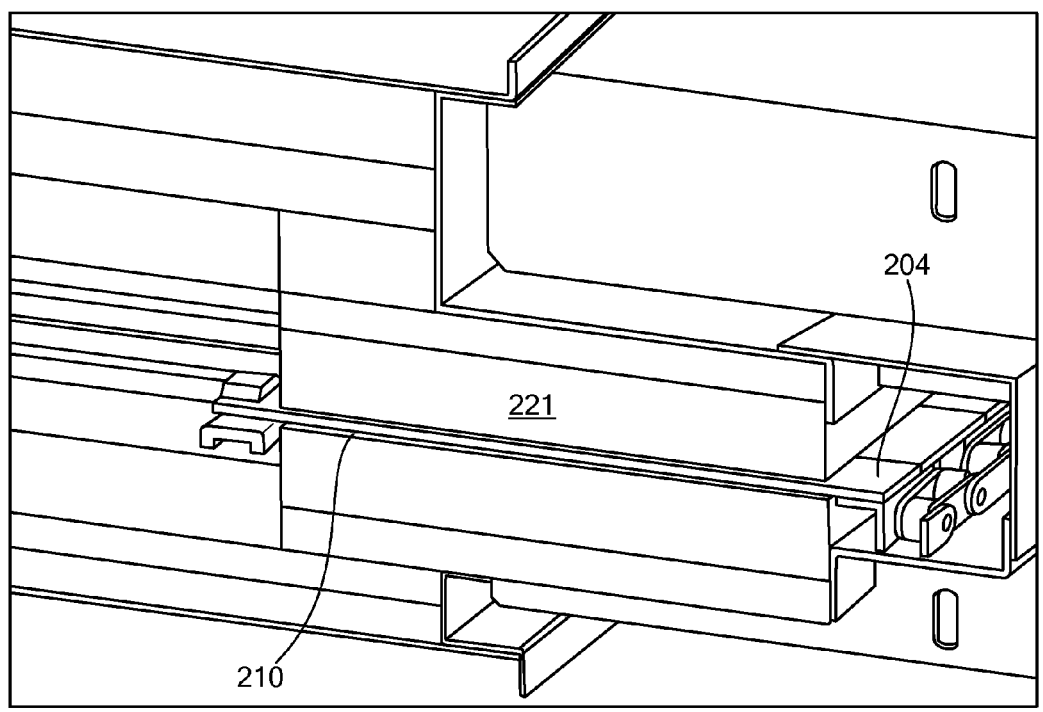
FIG. 12j is a cutaway perspective view showing the end strip disposed in a slit in the side wall of the furnace.

Each insulated side wall 221 of the furnace chamber has a narrow slit 210 extending from a side of the furnace chamber to outside the chamber as shown in FIGS. 12*e* and 12*j*. The slit is of sufficient width to accommodate the strips 204 for travel along the length of the chamber, and sufficiently narrow such that there is minimal air or gas flow between the inside of the furnace chamber and outside environment. The process chamber can be maintained to intended temperatures and temperature profiles without adverse affect by the slits. The chain and accompanying elements outside the chamber remain relatively cool. In the embodiment of FIG. 12*e*, the internal rail 217 is in a side wall recess, and in the embodiment of FIG. 12*g*, the rail 217 is flush with the side wall.

Heaters 300 are provided at the top and bottom of the furnace chamber as shown in FIG. 12*e*. The heaters can be, for example, electrical coil heaters disposed in grooves in the top and bottom walls of the chamber. The heaters can be variously energized to control temperature across the width and length of the furnace chamber or zones thereof. In one example, three heaters are disposed across the width of the chamber, each being separately controllable.

Figure 12K:
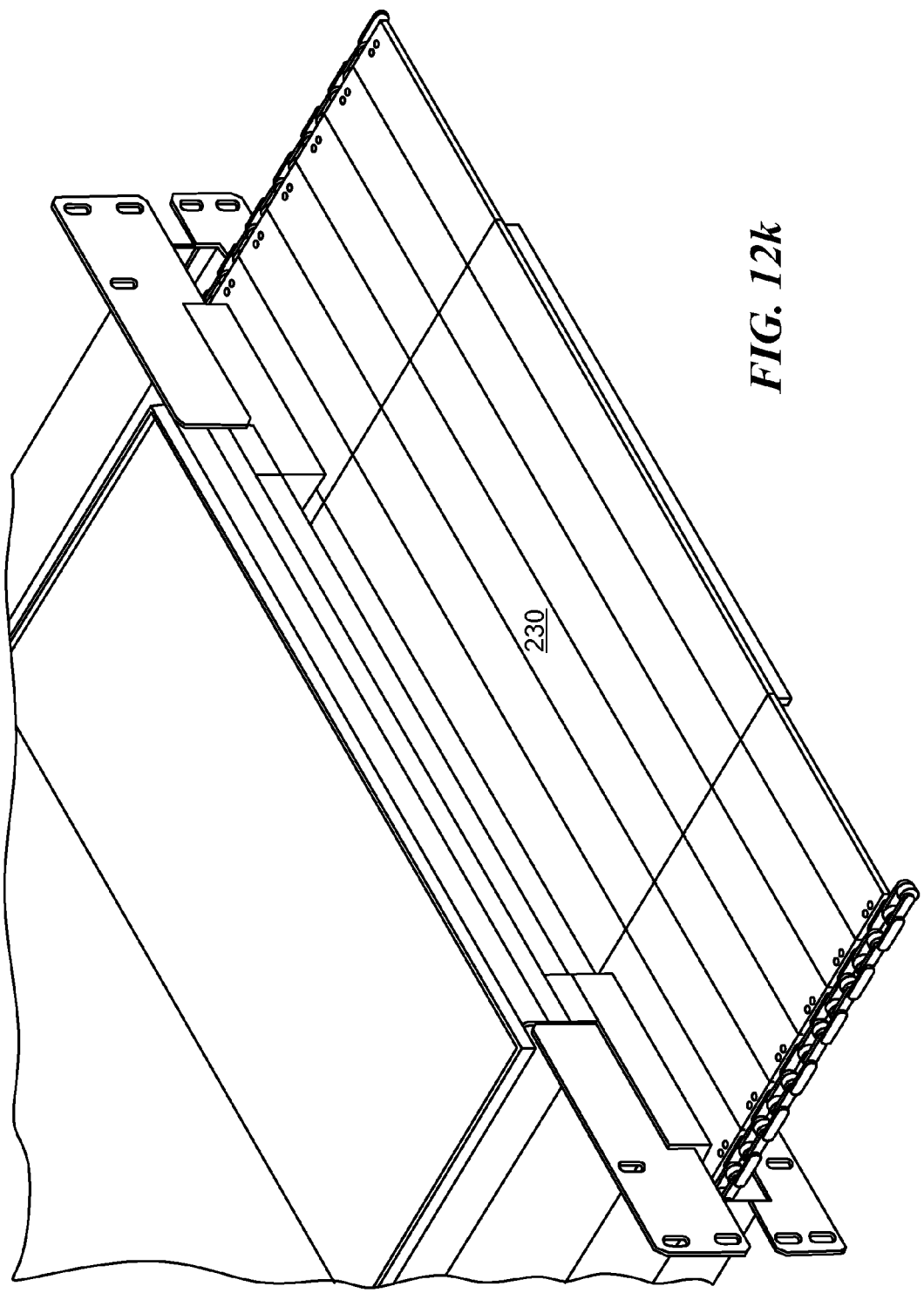
FIG. 12k is a perspective view of another embodiment in which the product support surface is substantially continuous.

A variation of the embodiment just described is shown in FIG. 12*k*. The product support surface in this version is provided by coated metal planks 230 coupled at their respective side ends to end strips or links 204 which in turn are coupled to the roller chains as described above. The planks 230 are typically fabricated of stainless steel coated with a ceramic material. This embodiment can typically be employed for temperatures up to about 300° C.

Figure 12L:
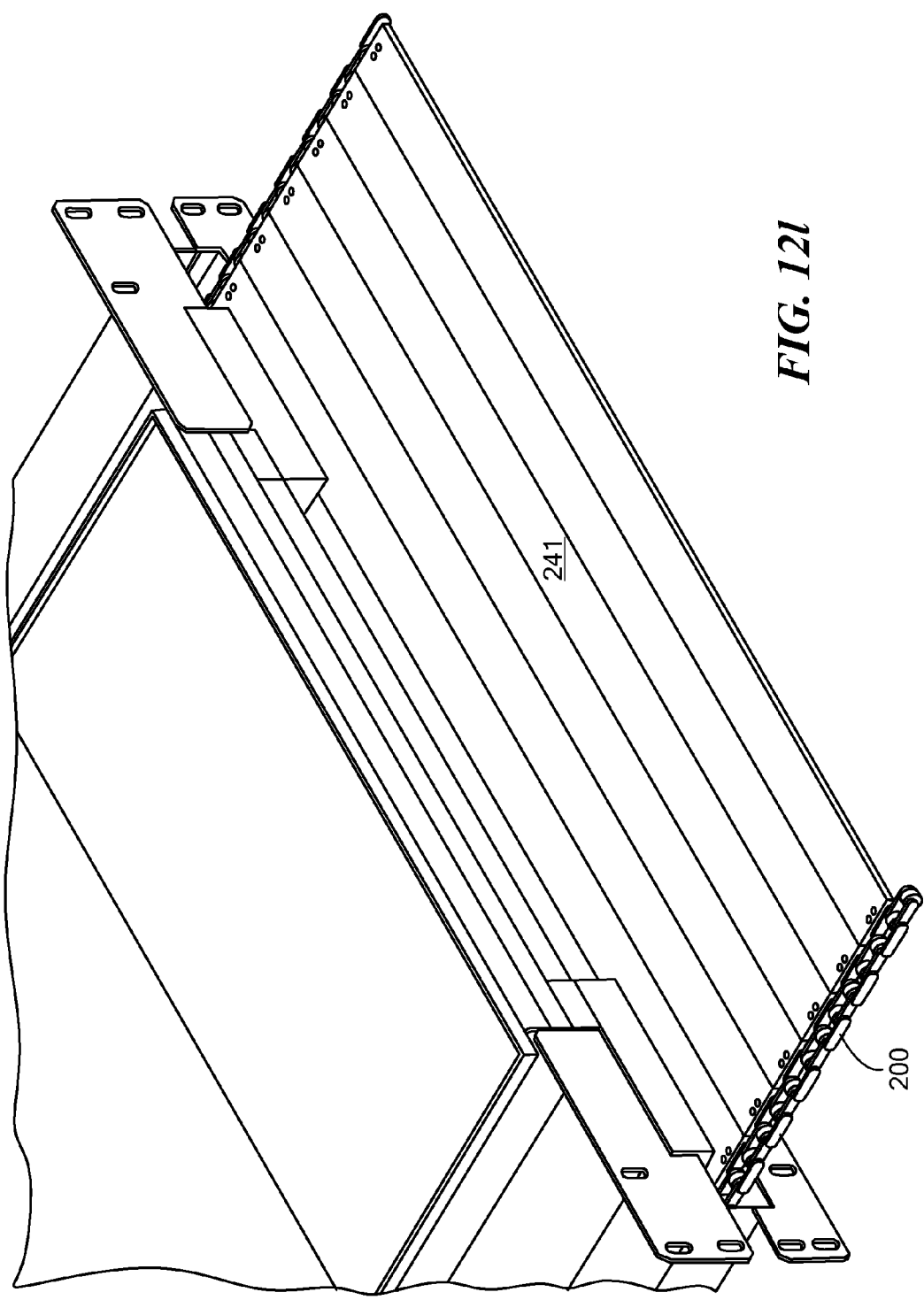
FIG. 12l is an alternative embodiment of a substantially continuous conveyor embodiment similar to that of FIG. 12k.

A roller chain embodiment can also be implemented with a full deck ceramic conveyor as shown in FIG. 12*l*. A ceramic sheet 240 is composed of ceramic strips 241 abutted to each other and coupled at respective sides to respective roller chains 200. Side portions of the strips pass through the slits in the side walls of the furnace chamber. This version is typically suitable for relatively narrower belt widths of about 10-12 inches, and is also typically operative at temperatures of about 1300° C.

Figures 12M, 12N:
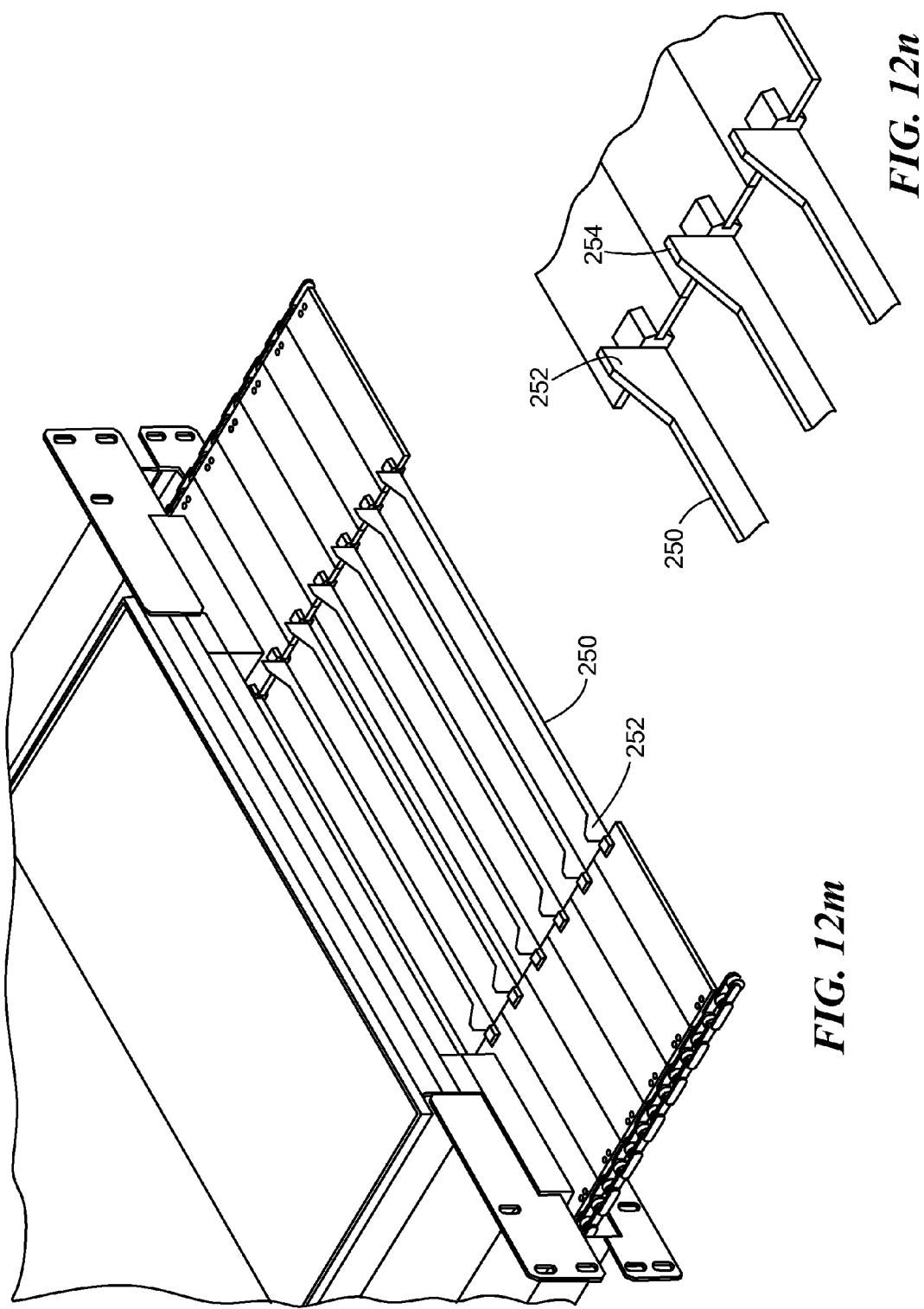
FIG. 12m is a perspective view of an embodiment having product support elements having point or edge supports.
FIG. 12n is a cutaway perspective view illustrating the support elements and edge supports.
Figure 13A:
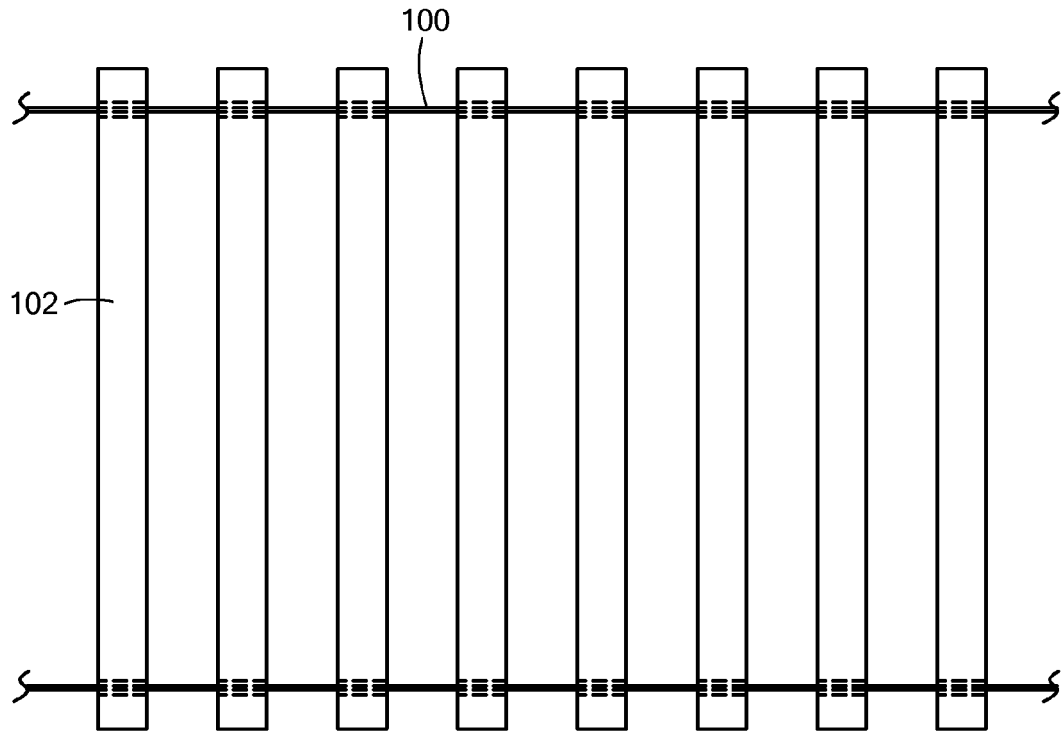
FIG. 13a shows an embodiment using a silicon carbide rope ladder configuration.
Figure 13B:
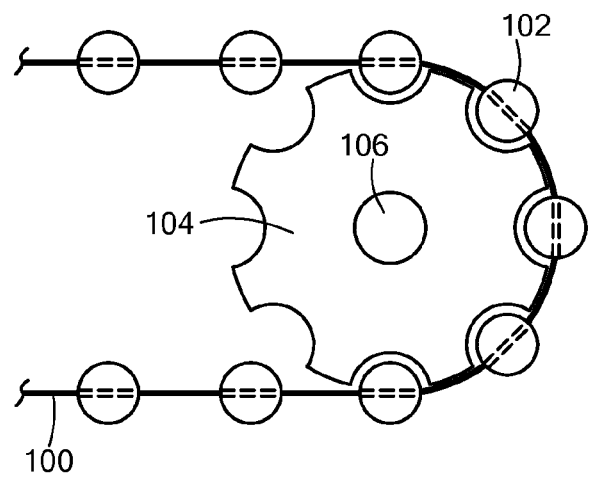
FIG. 13b is an elevation view showing the conveyor rods and sprocket wheel.

The product support elements of the conveyor can be configured to provide point or edge support of a product, as is sometimes desirable for particular products. An exemplary embodiment is shown in FIGS. 12*m* and 12*n* in which the product support elements are flat bars 250 which have raised elements 252 on respective side ends. The raised elements have a profile of truncated triangular shape in which the top surface 254 can engage and support a product such as a solar wafer. The bars 250 are typically made of ceramic material. The bars are coupled at their respective ends to respective strips or links 204.

A further embodiment is shown in FIGS. 12*o* and 12*p*. The portion of the conveyor passing through the furnace chamber comprises powder trays 260. Each tray has overlapping elements 262 and 264 as seen in FIG. 12*p* which limits powder spill. Each side of the trays are coupled to respective strips 204 by suitable connectors or fasteners 261. The trays are typically fabricated of a ceramic or silicon carbide material. FIG. 12*p* shows a cross section where the end of the tray slides into a matching female shape in a cast block of ceramic. The block of ceramic is connected to plates 204 that go through the insulating side wall and connect to the chain, as in the above embodiments.

These trays are used in those instances where a ceramic or other powder is supplied to the trays and heated in the furnace to provide sintering or other intended processing of the powder. The trays are integrated in the conveyor belt and move in a continuous cycle through the furnace chamber and along a return path from the exit end of the furnace to the entrance and thereof.

This tray configuration in which the trays are part of the conveyor, is more efficient and less complex than conventional powder conveyors which usually are pusher type conveyors in which separate individual trays are pushed through the furnace and are returned from the exit of the furnace to the entrance of the furnace by a separate return mechanism.

Another embodiment is shown in FIGS. 13a-13g in which a rope ladder configuration is employed. The rope ladder includes respective silicon carbide ropes 100 having silicon carbide rods 102 extending therebetween. The ropes 100 are threaded through openings provided in the rods. The rods cooperate with a sprocket wheel 104 (FIG. 13b) which is rotatable on an axle 106 for driving the conveyor. The product support rods can be of various configurations and can be attached to the driving ropes by various means.

In FIG. 13c silicon carbide tubes 108 are fitted over a pin or rod 110 extending between and connected to the side ropes 112. In FIG. 13d a silicon carbide rope 114 is woven through the pieces of a split rod 116 which is connected to the side ropes.

In FIG. 13e-13g each side rope 118 is looped around a groove 121 at each end of rod 120 to connect the end of the rod to the respective driving rope.

Figure 14A:
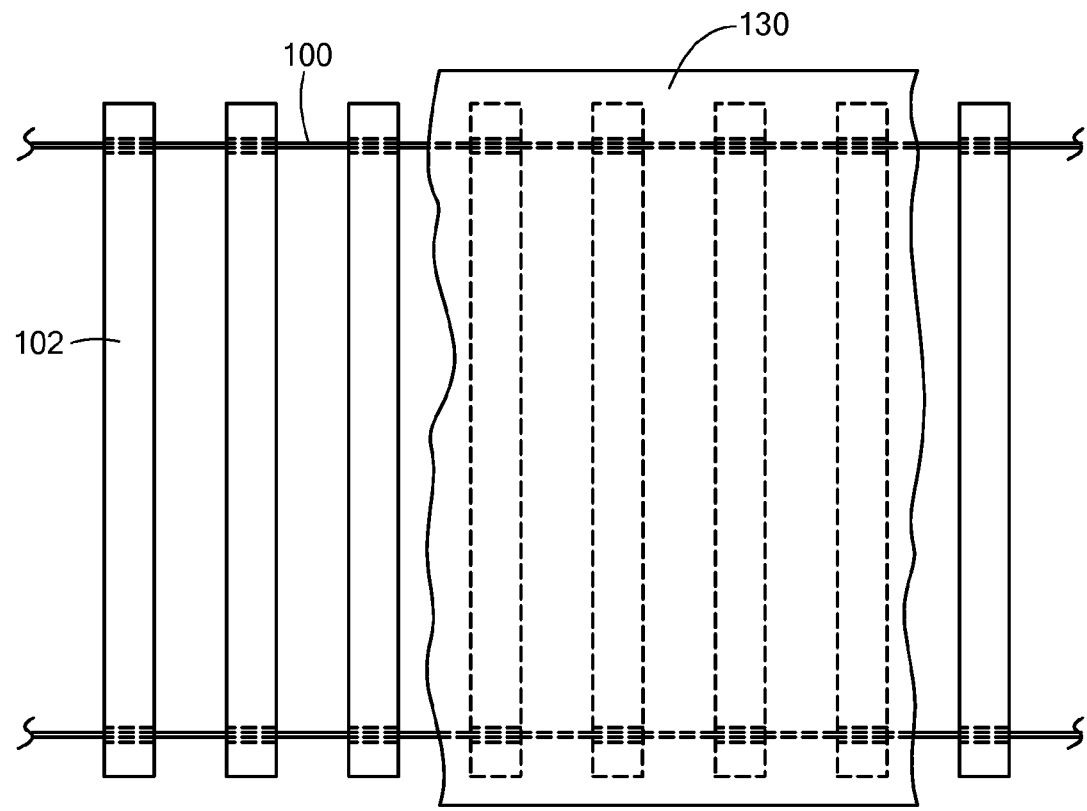
FIGS. 14a, 14b and 14c show an embodiment using the rope ladder configuration within a fabric belt.
Figure 14B:
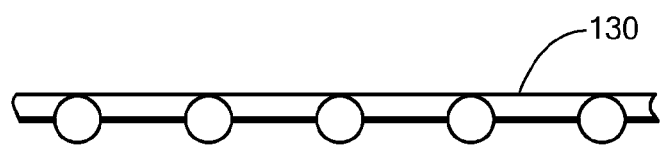
Figure 14C:
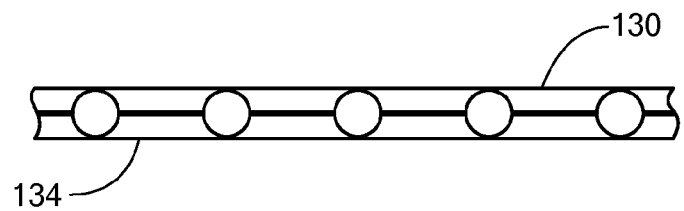

In FIGS. 14a and 14b a rope ladder such as shown in FIG. 13 has a fabric web 130 disposed on the rods 102. Alternatively, fabric layers 130 and 134 can be disposed on both sides of the rope ladder, as shown in FIG. 14c.

Figure 15A:
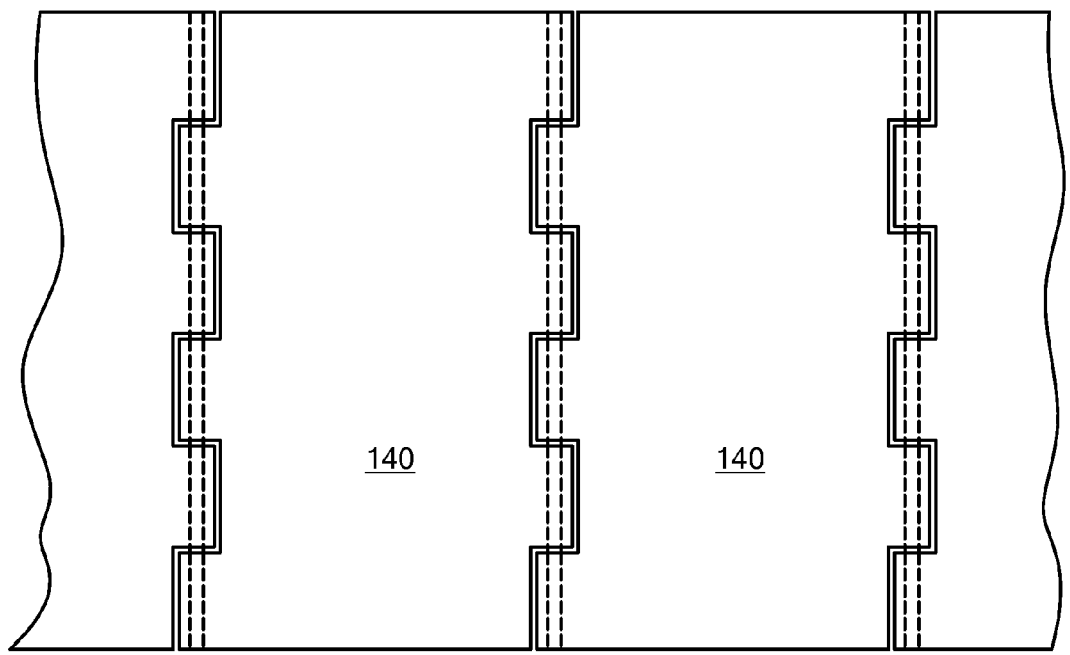
FIGS. 15a, 15b and 15c show an embodiment using fabric belt sections pivotally linked together.
Figure 15B:
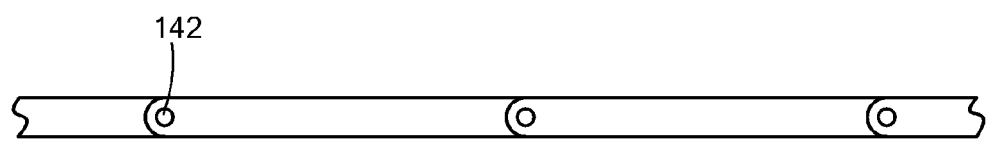
Figure 15C:
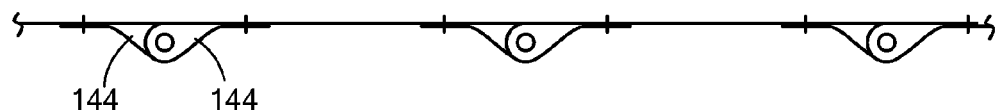

In FIG. 15a-15c a fabric conveyor belt is formed by interconnected fabric sections 140 having stitched ends on the leading and trailing ends of each section. The ends of the fabric sections are coupled to adjacent like sections by connecting pins or rods 142 to provide an effectively continuous fabric conveying surface. Each fabric section can be configured to be a double sided loop as in 15b. Alternatively, the forward and trailing ends 144 of each section 140 can be stitched to provide end loops as in 15c.

Figure 16A:
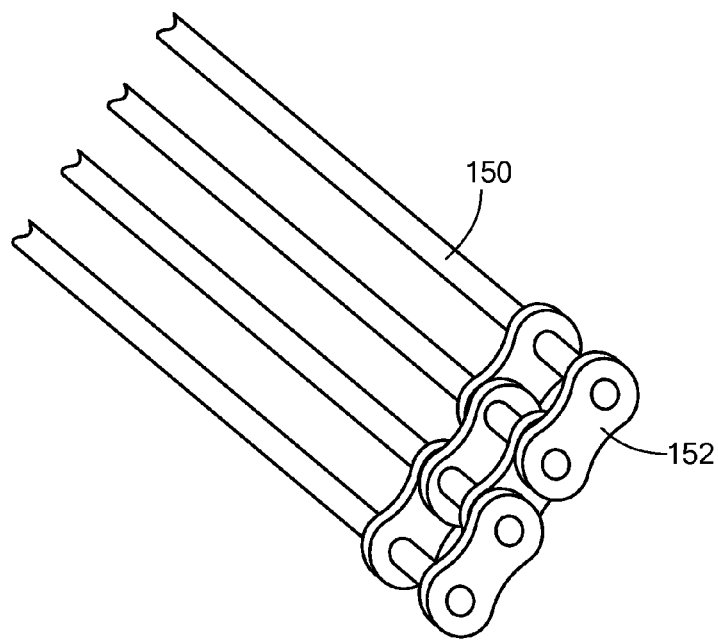
FIGS. 16a and 16b show perspective and top views respectively of an embodiment having cross rods driven by outer chains.
Figure 16B:
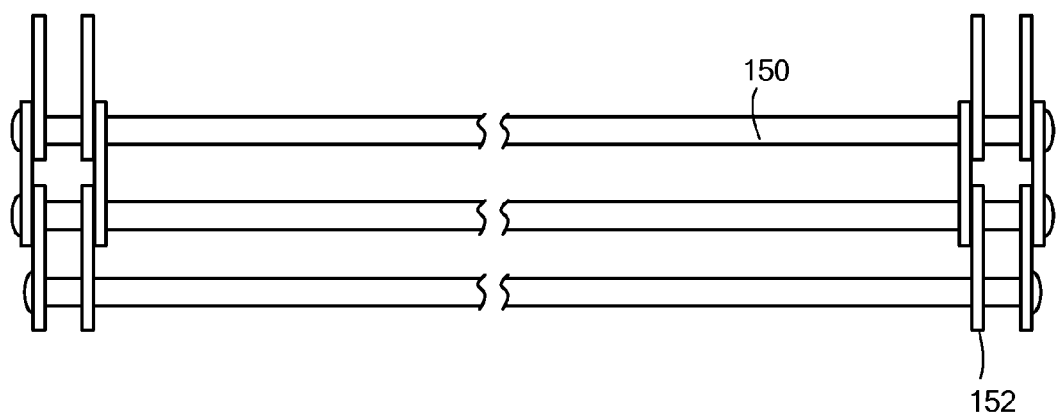

FIGS. 16a and 16b show another embodiment using roller chains on respective sides of the conveyor and cooperative with drive sprockets for moving the conveyor through the furnace. In this embodiment the chains are disposed outside of the furnace chamber, as in FIGS. 7 and 8. Tubes or bars 150 extend between the roller chains 152 and are fitted at respective ends to the links of the roller chains. The tubes or bars are typically stainless steel and are plasma coated with a ceramic material to provide a non-metallic surface for support of the product.

The invention is not to be limited by the embodiments shown and described and is intended to embrace the spirit and true scope of the appended claims.

What is claimed is:

1. A high temperature conveyor belt for use in a high temperature furnace comprising:
    a metal conveyor belt composed of a plurality of interconnected links; and
    a plurality of non-metallic elements each attached to links of the metal conveyor belt in spaced disposition across the width of the metal belt and along the length of the metal belt, the non-metallic elements defining a conveying surface on which products can be conveyed through the furnace;
    wherein each of the non-metallic elements include a high temperature material standoff having a slot slidably fitted over a link of the metal belt.

2. The conveyor belt of claim 1 wherein the conveying surface of each standoff is flat.

3. The conveyor belt of claim 1 wherein the conveying surface of each standoff has an edge for line content with products.

4. The conveyor belt of claim 1 wherein the conveyor surface of each standoff has a point for point content with products.

5. The conveyor belt of claim 1 wherein the conveyor surface of each standoff has a locking element to secure the standoff to a belt link.

* * * * *